(12) United States Patent
Garbus, Jr.

(10) Patent No.: US 7,478,922 B2
(45) Date of Patent: Jan. 20, 2009

(54) SET-POINT VALIDATION FOR COLOR/INTENSITY SETTINGS OF LIGHT FIXTURES

(75) Inventor: Michael E. Garbus, Jr., Reston, VA (US)

(73) Assignee: Renaissance Lighting, Inc., Herndon, VA (US)

( * ) Notice: Subject to any disclaimer, the term of this patent is extended or adjusted under 35 U.S.C. 154(b) by 83 days.

(21) Appl. No.: 11/717,710

(22) Filed: Mar. 14, 2007

(65) Prior Publication Data

US 2008/0225520 A1 Sep. 18, 2008

(51) Int. Cl.
F21V 9/00 (2006.01)

(52) U.S. Cl. .................. 362/231; 362/85; 362/230; 362/276; 362/802

(58) Field of Classification Search ........... 362/231, 362/84, 85; 356/402, 403, 419; 250/200, 250/216, 226
See application file for complete search history.

(56) References Cited

U.S. PATENT DOCUMENTS

| | | | |
|---|---|---|---|
| 4,389,118 A | 6/1983 | Yuasa et al. | |
| 6,007,209 A | 12/1999 | Pelka | |
| 6,016,038 A | 1/2000 | Mueller et al. | |
| 6,222,172 B1 | 4/2001 | Fossum et al. | |
| 6,357,889 B1 | 3/2002 | Duggal et al. | |
| 6,897,876 B2 | 5/2005 | Murdoch et al. | |
| 6,965,205 B2* | 11/2005 | Piepgras et al. | 315/318 |
| 6,995,355 B2 | 2/2006 | Rains, Jr. et al. | |
| 7,014,336 B1* | 3/2006 | Ducharme et al. | 362/231 |
| 7,064,498 B2* | 6/2006 | Dowling et al. | 315/291 |
| 7,108,413 B2 | 9/2006 | Kwong et al. | |
| 7,116,354 B2* | 10/2006 | Rice et al. | 348/187 |
| 7,144,131 B2* | 12/2006 | Rains | 362/231 |
| 7,145,125 B2 | 12/2006 | May et al. | |
| 2003/0034985 A1* | 2/2003 | Needham Riddle et al. | 345/589 |
| 2003/0076056 A1 | 4/2003 | Schuurmans | |
| 2004/0160199 A1* | 8/2004 | Morgan et al. | 315/312 |
| 2004/0245946 A1 | 12/2004 | Halter | |
| 2004/0263882 A1 | 12/2004 | Ito et al. | |
| 2005/0040774 A1* | 2/2005 | Mueller et al. | 315/291 |
| 2005/0062446 A1* | 3/2005 | Ashdown | 315/324 |

(Continued)

OTHER PUBLICATIONS

Official Filing Receipt issued for U.S. Appl. No. 11/585,779, mailed Nov. 14, 2006, along with the Specification and Drawings thereof.

(Continued)

Primary Examiner—Ali Alavi
(74) Attorney, Agent, or Firm—McDermott Will & Emery LLP

(57) ABSTRACT

Disclosed examples of lighting systems having at least three light sources of different colors may be controlled by validating input settings representing chromaticity and/or intensity of desired light to be generated by determining if the respective lighting system is capable of generating the desired light. This may involve comparing the chromaticity and/or intensity to a three-dimensional gamut representing chromaticity and associated intensities that the lighting system is capable of generating. The top contour of the gamut represents the maximum intensities for every chromaticity which the lighting system is capable of generating. Specifically the top contour is defined by points representing the maximum attainable intensities that each light source is capable of generating and the maximum intensity attainable by the lighting system.

61 Claims, 11 Drawing Sheets

U.S. PATENT DOCUMENTS

| | | |
|---|---|---|
| 2005/0063063 A1* | 3/2005 | Ashdown .................... 359/599 |
| 2005/0094956 A1 | 5/2005 | Hong |
| 2006/0016960 A1 | 1/2006 | Morgan et al. |
| 2006/0104058 A1 | 5/2006 | Chemel et al. |
| 2006/0158881 A1 | 7/2006 | Dowling |
| 2006/0186819 A1 | 8/2006 | Young |
| 2006/0237636 A1 | 10/2006 | Lyons et al. |

OTHER PUBLICATIONS

U.S. Office Action Issued in U.S. Appl. No. 11/233,036, dated on May 30, 2007.

International Search Report and Written Opinion issued in Patent Application No. PCT/US 08/57067 dated on Jul. 25, 2008.

* cited by examiner

SET-POINT VALIDATION FOR COLOR/INTENSITY SETTINGS OF LIGHT FIXTURES

FIELD OF THE INVENTION

The present subject matter relates to control of lighting systems having multiple light sources each of which are capable of outputting different colors of light, based on a determination that an input setting corresponds to an operational setting within the range of output performance of a particular lighting system.

BACKGROUND

An increasing variety of lighting applications require a precisely controlled spectral characteristic of the radiant energy. It has long been known that combining the light of one color with the light of another color creates a third color. For example, the commonly used primary colors Red, Green and Blue of different amounts can be combined to produce almost any color in the visible spectrum. Adjustment of the amount of each primary color enables adjustment of the spectral properties of the combined light stream. Recent developments for selectable color systems have utilized light emitting diodes or other solid state light sources as the sources of the different light colors.

Light emitting diodes (LEDs) for example were originally developed to provide visible indicators and information displays. For such luminance applications, the LEDs emitted relatively low power. However, in recent years, improved LEDs have become available that produce relatively high intensities of output light. These higher power LEDs, for example, have been used in arrays for traffic lights. Today, LEDs are available in almost any color in the color spectrum.

Additionally, for many lighting applications, an LED based fixture incorporates a circuit board supporting and providing electrical connections to a number of individually packaged LEDs. Often the LEDs are arranged in a fairly tight matrix array (see e.g. U.S. Pat. No. 6,016,038), although a variety of other arrangements are known. For example, U.S. Pat. No. 6,995,355 to Rains, Jr. et al. discloses lighting systems using circular or linear arrangements of LED sets as well as rectangular matrix arrangements and other position patterns. In the noted examples, the sets of LEDs have included LEDs configured for emitting different individual colors or wavelengths (e.g. red, green and blue), although the U.S. Pat. No. 6,995,355 patent also suggests inclusion of white LEDs or other white light sources. The red, green and blue light allows adjustment and control of the character of the combined light emitted by the system. As the quality of white LEDs continues to improve, newer lights will utilize similar arrangements of LEDs where all or some the LEDs are white LEDs. Even with white light systems, some implementations use multiple colors and light mixing to provide color temperature adjustment.

It is well known that many different combinations of wavelengths can produce the same perception of color, and that "Chromaticity" has been long been used to describe the perceived color of a visual stimulus of a human. Many models have been used describe Chromaticity. In one implementation, the CIE system characterizes a given visual stimulus by a luminance parameter Y and two chromaticity coordinates x and y that specify a particular point on the well-known chromaticity diagram. The CIE system parameters Y, x and y are based on the spectral power distribution of the energy emission from a light source. This model also takes into consideration various color sensitivity functions which correlate generally with the response of the human eye.

Also, commonly used primary colors Red, Green and Blue of different amounts can be combined to produce almost any color in the visible spectrum in a lighting system. These colors can be represented by the CIE tristimulus values, commonly referred to as X, Y, and Z, respectively, and as illustrated by FIG. 16. Thus, the CIE xyY coordinates may be converted to CIE XYZ coordinates for controlling aforementioned LEDs using the following equations:

$$X = \frac{x}{y}Y \quad \text{(Eqn. A)}$$

$$Y = Y \quad \text{(Eqn. B)}$$

$$Z = \frac{1-x-y}{y}Y \quad \text{(Eqn. C)}$$

However, LEDs have different operating characteristics such that no two LEDs are producing the identical color of light or intensity. If mass producing light fixtures that produce combined light, it is conceivable that no two light fixtures are able to produce the same light for all input settings. Hence, a need exists for a way to validate input settings to an LED fixture so as to avoid generating unintended light, and to perform the task in an efficient manner that can be implemented on a large production scale. Preferably, such a technique should offer an increased degree of responsiveness to user inputs.

SUMMARY

The teachings herein alleviate one or more of the above noted problems by providing methods for defining operational limitations and/or lighting system and/or control of a lighting system comprising at least first, second and third light sources generating light of respective first, second and third colors. Also, the lighting system is configured to output light containing controlled amounts of light generated by at least one of the first, second and third light sources.

The operational limitations of the lighting system may be determined by determining a first maximum attainable intensity of light by measuring light output from the lighting system where the first light source is turned on and the second and third light sources are turned off. This is repeated for the second and third light sources. Specifically, a second maximum attainable intensity of light may be determined by measuring light output from the lighting system where the second light source is turned on and the first and third light sources are turned off. Also, a third maximum attainable intensity of light may be determined by measuring light output from the lighting system where the third light source is turned on and the first and second light sources are turned off. A maximum intensity of light attainable by the system represented by light generated by the first, second and third light sources may be determined as well. Accordingly, the lighting system may be set to determine whether or not desired light corresponding to a given input setting to the lighting system is within a three-dimensional gamut representing colors of light and corresponding attainable intensities that the lighting system is capable of generating. The top contour of the gamut is defined by points corresponding to the first, second and third maximum attainable intensities and the maximum intensity of light attainable by the lighting system.

Another implementation of novel concepts discussed herein is a method for processing input color parameters of chromaticity and intensity to a lighting system and controlling illumination outputs of a plurality of light sources of the lighting system to generate a desired color of light corresponding to the input color parameters. This may be accomplished by determining whether the input color parameters of chromaticity and intensity places the desired color inside or outside of a gamut representing colors of light of which the lighting system is capable of generating. The gamut is defined by a 3-dimensional coordinate system whereby each axis thereof corresponds to chromaticity or intensity values. Accordingly, the plurality of light sources are driven to emit light having the desired color when the input color parameters of chromaticity and intensity places the desired color within the gamut.

The foregoing may be implemented in a system for emitting light. The system includes a plurality of light sources for emission of light and for thereby producing visible light to form a light at least of portion of which is output from the system and a microcontroller for processing newly user inputted color parameters and controlling illumination emissions of the plurality of light sources. The microcontroller is configured to evaluate the gamut defined by the 3-dimensional coordinate system of chromaticity and intensity values, where the gamut is representative of colors of light in which the system is capable of generating. Moreover, the microcontroller executes the method described above for determining if the system is capable of generating light of the desired color.

Yet another implementation of the novel concepts discussed herein is a method for correcting a color parameter corresponding to a desired color having specific chromaticity and intensity values that is input to a lighting system comprising a plurality of light sources for generating light where the lighting system is not capable of generating light corresponding to the desired color. This may be accomplished by evaluating at least one of specific chromaticity and intensity values with respect to a gamut representing colors of light of which the lighting system is capable of generating where the gamut is defined by a 3-dimensional coordinate system. Each axis of the gamut corresponds to chromaticity or intensity values. Also, at least one of the specific chromaticity and intensity values to be corrected is such as to place the desired color outside of the gamut. Accordingly, the at least one of the specific chromaticity and intensity values may be changed to select a color within the gamut.

The foregoing may be implemented in a system for emitting light. The system includes a plurality of light sources for emission of light and for thereby producing visible light to form a light at least of portion of which is output from the system and a microcontroller for processing newly user inputted color parameters and controlling illumination emissions of the plurality of light sources. The microcontroller is configured to evaluate the gamut defined by the 3-dimensional coordinate system of chromaticity and intensity values, where the gamut is representative of colors of light in which the system is capable of generating. Moreover, the microcontroller executes the method described above for adjusting the newly input color parameters.

The detailed description below discloses details of the aforementioned methods as well as methods of operating a lighting system that has been set as described herein. Moreover, the detailed description describes such a lighting apparatus that is capable of being set in the described manner.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of the methodologies, instrumentalities and combinations particularly pointed out in the appended claims.

DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Figure 1:
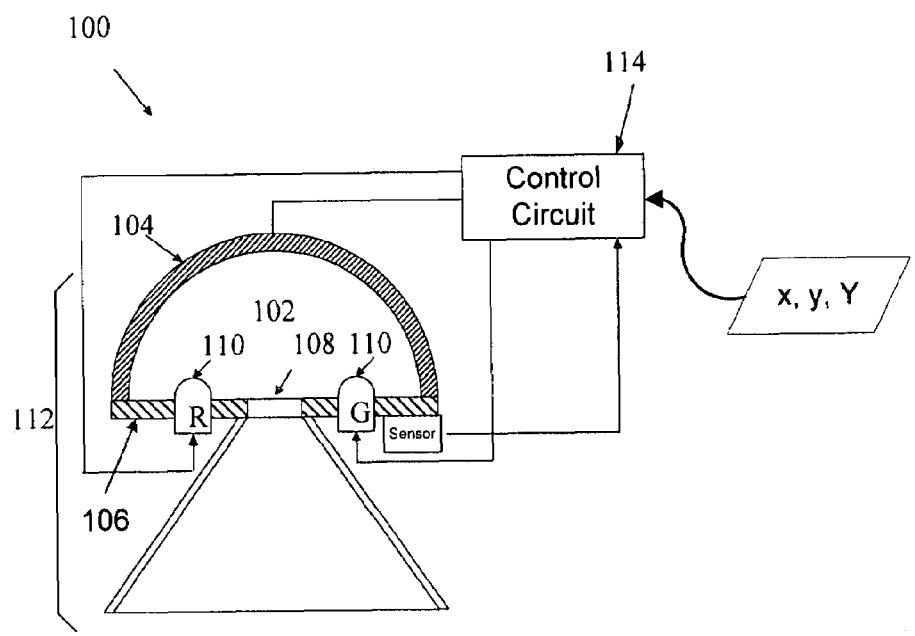
FIG. 1 illustrates an LED light fixture and associated components.

The examples presented below provide solutions to the aforementioned problems of generating unintended light in the conventional lighting art. Specifically, the inventors have found that solid state lighting systems may be set to generate combined light having desired colors and intensities of which the lighting system is capable of generating. Consider for example a light distribution apparatus or system 100 as illustrated by FIG. 1, which is a partial block diagram and a cross-sectional illustration of the light fixture. For illumination or task lighting applications, the fixture emits light in the visible spectrum. However, when using multiple such fixtures, color and/or intensity of light may appear different from fixture to fixture for the same input setting. This typically occurs when multiple fixtures are controlled to generate a color and/or intensity of which at least one of the fixtures is incapable of generating. The inventors have found a way to manage the foregoing problem by validating the input setting to each fixture by determining whether the respective fixture is capable of generating light according to the input setting. If validated, the light fixture may generate the corresponding light. If invalid, the light fixture may be controlled to not output any light or controlled to output light where color and/or intensity settings have been adjusted specific to the capabilities of the light fixture. However, before further discussion, it is helpful to first understand the make up of such an exemplary fixture.

FIG. 1 depicts a lighting system 100, by way of example, of a type that may be configured to respond to input settings as taught herein to generate light output. Those skilled in the art will recognize the present teachings are applicable to other lighting systems. In FIG. 1, the illustrated system 100 includes an optical cavity 102 having a diffusely reflective interior surface, to receive and combine light energy of different colors/wavelengths. The disclosed apparatus may use a variety of different structures or arrangements for the optical integrating cavity. The illustrated cross-section of the optical cavity 102 is approximately hemispherical. However, the optical cavity 102 may have various shapes such as semi-cylindrical with the cross-section taken perpendicular to the longitudinal axis. Other applications may call for rectangular or square cross-sections.

At least a substantial portion of the interior surface(s) of the optical cavity 102 exhibit(s) diffuse reflectivity. It is desirable that the cavity surface have a highly efficient reflective characteristic, e.g. a reflectivity equal to or greater than 90%, with respect to the relevant light wavelengths. For example, the interior surface of that illustrated by FIG. 1 is highly diffusely reflective to energy in the visible, near-infrared, and ultraviolet wavelengths.

As illustrated by FIG. 1, a hemispherical dome 104 and a substantially flat cover plate 106 form the optical cavity 102. However, other arrangements may be available. In the example the interior facing surfaces of the dome 104 and the cover plate 106 are highly diffusely reflective, so that the resulting cavity 102 is highly diffusely reflective with respect to the radiant energy spectrum produced by the system 100. In other arrangements, a portion or all of the inner surface of the dome 104 have a highly efficient reflective characteristic, e.g. a reflectivity equal to or greater than 90%, with respect to the relevant wavelengths, and the facing surface of the cover plate 106 is at least substantially specular in nature. In such arrangements, the volume or chamber 102 is an integrating type optical cavity. Although shown as separate elements, the dome 104 and plate 106 may be formed as an integral unit.

The optical integrating cavity 102 has an optical aperture 108 as a transmissive path for allowing emission of combined radiant energy. In the example, the aperture 108 is a passage through the approximate center of the cover plate 106, although the aperture may be at any other convenient location on the plate or the dome. Because of the diffuse reflections within the cavity 102, light within the cavity is integrated, mixed or combined before passage thereof out of the aperture 108. In other words, the system 100 is capable of emitting combined light downward through the aperture 108. However, the light fixture part of the system 100 may be oriented in any desired direction to perform a desired application function, for example to provide visible illumination of persons or objects in a particular direction or location with respect to the fixture or to illuminate an area or room. Although only a single aperture is shown, the fixture 112 may include multiple apertures. Also, in some applications, it may be desirable for some of the light combined within the cavity 102 to pass through a transmissive portion of the cavity wall.

The system 100 also includes light emitting diodes (LEDs) 110 as the sources of light energy although other types of light sources, such as other solid state light emitters, may be used. In the example, the sources are different primary color (RGB) LEDs 110, two of which (Red and Green) are visible in the illustrated cross-section. The Blue LED (not shown) would be seen in a different cross section. Although only one LED of each color is shown, typical implementations use a plurality of LEDs of one or more or all of the colors.

The LEDs 110 supply light energy into the interior of the optical integrating cavity 102. As shown, the points of emission into the interior of the optical integrating cavity are not directly visible through the aperture 108. Direct emissions from the sources reflect off a surface of the cavity 102. The cavity 102 effectively integrates, mixes or combines the light energy of different colors, so that the integrated or combined light emitted through the aperture 108 includes the light energy of all the various wavelengths in relative amounts substantially corresponding to the relative amounts that the sources input into the cavity 102. The diffuse reflective processing by the cavity converts the multiple point sources to a virtual source of light, of the combined light color and intensity at the aperture 108. The virtual source will have a high degree of uniformity across the area of the aperture and typically will not exhibit pixilation.

The dome 104 and cover plate 106 forming the cavity 102, together with the LEDs 110 and possibly one or more processing elements for processing the light output through the aperture 108 (such as a deflector (not shown)), form a light fixture 112. The integrating or mixing capability of the cavity 102 serves to project light of any color, including white light, by adjusting the amount of light output by the various sources 110 coupled into the cavity 102. U.S. Pat. No. 6,995,355 to Rains, Jr. et al., the disclosure of which is entirely incorporated herein by reference, provides additional information as to the materials; structure and configuration of numerous examples of systems and various elements thereof of the type exemplified by FIG. 1.

In the illustrated example, control of the drive currents applied to drive light production by the LEDs 110 controls the color characteristics of the combined light output by the fixture 112. Those skilled in the art will recognize that the circuitry may also modulate the drive signals to control amounts of energy output by each solid state lighting element. Examples of the control circuit 114 will be discussed in detail below.

As discussed above, multiple fixtures tend to generate light of different color and/or intensity where the input parameters are near or beyond the output limitations of the multiple fixtures. This occurs when spectral output characteristics from one LED 110 to the next differ. Taking a red LED 110 as an example, one red LED may be capable of generating vibrant red colors of light at a maximum intensity whereas another LED may be capable of generating less vibrant red colors of light at a maximum intensity. Two light fixtures, as shown in exemplary FIG. 1, with such LEDs will have different output characteristics due to the difference in spectral output of the red LEDs when the LEDs of the two fixtures are driven with the same current levels. This problem compounds as more and more of the same fixtures are manufactured and are used in the same setting where differences between like light fixtures are more prevalent. In other words, two different fixtures may generate noticeably different output light for the same input setting. Various techniques are known for setting systems to provide substantially similar light outputs for a given input setting. The inventors have found that a light fixture can validate light input settings to generate light of which the fixture are capable of generating.

The foregoing may be accomplished by setting each fixture to generate light for color parameter input settings and/or configuring the system to determine if input settings correspond to light outputs that fall within a gamut which represents the range of color and/or intensities of light of which the fixture is capable of generating. The gamut may be based on the CIE 1931 Chromaticity Diagram space, such as that illustrated by FIG. 15, specific for the operating conditions of each light fixture. This Chromaticity Diagram space uses a Cartesian coordinate system with points defined as (x, y, z), which can be converted to (x, y, Y) coordinates as described above. The x and y-coordinates define a chromaticity, and Y-coordinates define intensity. All colors and corresponding intensities within the gamut are achievable for a given fixture, while all colors and corresponding intensities outside of the gamut cannot be achieved for the given fixture.

The gamut can be defined by a few key points in a 3-d coordinate system having x, y, Y axes. For instance, it is impossible to achieve chromaticity points outside of the gamut, because chromaticities are achieved by mixing certain proportions of the color of respective LEDs in a given fixture. Therefore, a footprint of the gamut, i.e., the gamut in the x-y plane of the 3-d coordinate system, may be a triangle formed by connecting points representing each of the colors of the LEDs in a given fixture. As described herein, the primary colors of red, green and blue correspond to the colors of the LEDs. However, defining the gamut in the foregoing manner sets a limitation on the (x,y) coordinates (i.e., chromaticity), but does not limit the Y-coordinates (i.e., intensity). To complete the gamut, the intensity limitations need to be described.

Light intensity is additive regardless of chromaticity. For example, the intensity of light which is composed of a red LED output at intensity $Y_1$, a green LED output at intensity $Y_2$, and a blue LED output at intensity $Y_3$ yields a total intensity of $Y_{total}=Y_1+Y_2+Y_3$. Using the additive principle, the limitations on the maximum intensity that a fixture can generate can be determined. Therefore, a lighting system will generate a maximum attainable intensity which is possible for the system when all LEDs of the system are set to respective maximum intensities.

Figure 2:
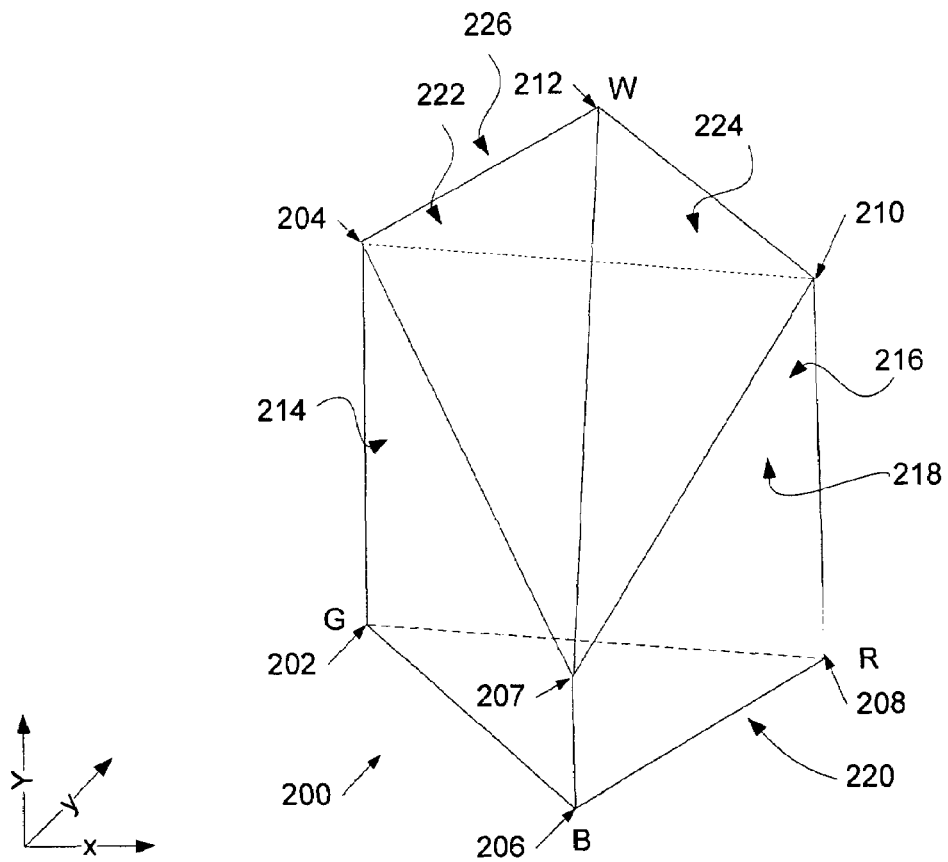
FIG. 2 provides a pictorial representation of a three-dimensional gamut of determined chromaticity and intensity values of which a given solid state lighting system is capable of generating.

FIG. 2 illustrates the gamut 200 defined according to the 3-d coordinate system as described above. Point 202 represents the (x,y) coordinate for the color of green on the 3-d coordinate system when the green LED is turned on and the blue and red LEDs are turned off. Point 204 represents the intensity measurement for the color at point 202. Specifically, on the 3-d coordinate system, the height of point 204 corresponds to the (Y) value of the (x,y,Y) coordinate that represents a maximum attainable intensity of light when the green LED is on at a maximum output. Moreover, the (Y) value may be determined using the calibrated sensor discussed below with respect to FIG. 5. Similarly, points 208 and 210 represent the (x,y) coordinate for the color of red and the associated maximum attainable intensity (the (Y) value) of light when the red LED is on at a maximum output and the green and blue LEDs are turned off. Point 206 represents the (x,y) coordinate for the color of blue, and the highest of point 207 corresponds to the associated maximum attainable intensity of light when the blue LED is on at a maximum output and the red and green LEDs are turned off. As just described, the gamut 200 may be defined according to at least four (x,y,Y) points. The intensity values (Y) for the respective colors typically will differ, e.g. depending on the number of respective color LEDs and/or differences in LED performance. In other words, the following points are measured: (1) intensity when the red LED is on at a maximum output; (2) intensity when the green LED is on at a maximum output; and (3) intensity when the blue LED is on at a maximum output. The fourth point 212 corresponds to a summation of all measured intensities (1)-(3), which corresponds to white light. However, this point may be measured by turning on red, green and blue LEDs at respective maximum outputs. In this simple example, the points 204, 207, 210, and 212 form a roughly pyramidal top or upper boundary of the gamut.

Points 202, 204, 206, 207, 208 and 210 form planes which form facets of the gamut 200. Specifically, a first plane 214 having points 202, 204, 207 and 206 bound one side of the gamut 200; a second plane 216 having points 206, 207, 208 and 210 bound another side; and a third plane 218 having points 202, 204, 208 and 210 bound yet another side of the gamut 200. Where each plane 214, 216, 218 intersect delineates the outer boundary of the gamut 200. The lower bound of intensity is when all LEDs are off. This forms a fourth plane 220 that is defined by the equation Y=0 corresponding to points 202, 206 and 208.

As discussed above, the intensity measurements when each respective LED is turned on and the other respective LEDs are turned off may be summed to determine the maximum attainable intensity of light that a lighting system is capable of generating. Alternatively, the maximum attainable intensity of light that a lighting system is capable of generating may be determined by turning all LEDs on to respective maximum outputs and measuring the intensity of light using a calibrated sensor, as discussed below with respect to FIG. 5. In a system using red, green and blue LEDs corresponding to the primary colors, when all LEDs are turned on the lighting system generates white light. When all such LEDs are turned on to maximize respective outputs, the lighting system generates white light of a particular color (e.g. temperature) at an intensity equal to the maximum attainable intensity of the lighting system. In FIG. 2, the white light at the maximum attainable intensity of the system corresponds to point 212. Because the outputs of all LEDs are maximized, point 212 corresponds to the apex of the gamut 200.

Points 212, 204 and 207 form a fifth plane 222; points 212, 210 and 207 form a sixth plane 224; and points 212, 210, and 204 form a seventh plane 226, all of which intersect at point 212 forming the apex of the gamut 200. Moreover, these planes form a top contour of the gamut 200. Furthermore, the first plane 212 and fifth plane intersect at a line formed by points 204 and 207. Other planes intersect forming lines, as illustrated. Accordingly, the shape of the gamut 200 may be defined by a plurality of intersecting planes. The lines formed by intersecting planes form facets of the gamut having polygonal shapes.

Figure 3:
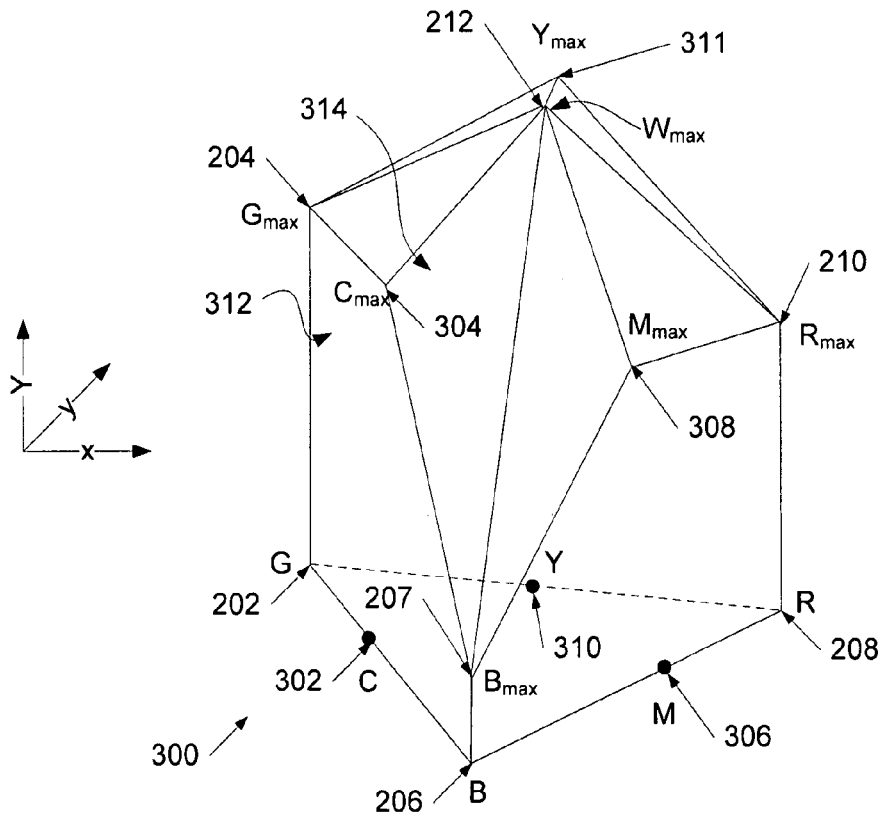
FIG. 3 provides another pictorial representation of a three-dimensional gamut of determined chromaticity and intensity values of which a given solid state lighting system is capable of generating where the gamut represents a larger number of intensities capable of being generated by the solid state lighting system when compared to that of FIG. 2.

Additionally, other colors of light and associated intensities may be measured for defining the gamut to a greater accuracy, such as that illustrated by FIG. 3. Specifically, the gamut 300 of FIG. 3 comprises ten intersecting planes to form ten polygonal facets of the gamut 300. The same points as discussed above with respect to FIG. 2 are maintained. However, the additional colors of light and associated intensities are generated by turning two of the three LEDs on and the other off in all combinations. For example, point 302 represents the color of cyan when both green and blue LEDs are turned on. Point 304 corresponds to the maximum achievable intensity when both green and blue LEDs are turned on to maximum outputs. Point 306 represents the color of magenta when both red and blue LEDs are turned on. Point 308 corresponds to the maximum achievable intensity when both red and blue LEDs are turned on to maximum outputs. Point 310 represents the color of yellow when both red and green LEDs are turned on. Point 311 corresponds to the maximum achievable intensity when both red and blue LEDs are turned on to maximum outputs.

In this example, the gamut 300 is formed by at least ten intersecting planes—the first plane 312 contains at least points 202, 204, 304, 207, and 206; the second plane 314 contains points 207, 304 and 212; and so on for each facet of the gamut 300 as illustrated. The intersecting planes form a plurality of facets of the gamut 300 where each facet has a polygonal shape, as illustrated by FIG. 3. In other words, the shape of the gamut 300 for the maximum achievable intensities can be described with several planes which are defined by all combinations of the red, green, blue, yellow, cyan, magenta, and white points. All planes will converge on the white point or apex 212. These planes which converge at the point 212 corresponding to the apex represent the top contour of the gamut 300. The lower bound of intensity is when all LEDs are off. This forms one plane that is defined by the equation Y=0 or points 202, 206, and 208.

Figure 4:
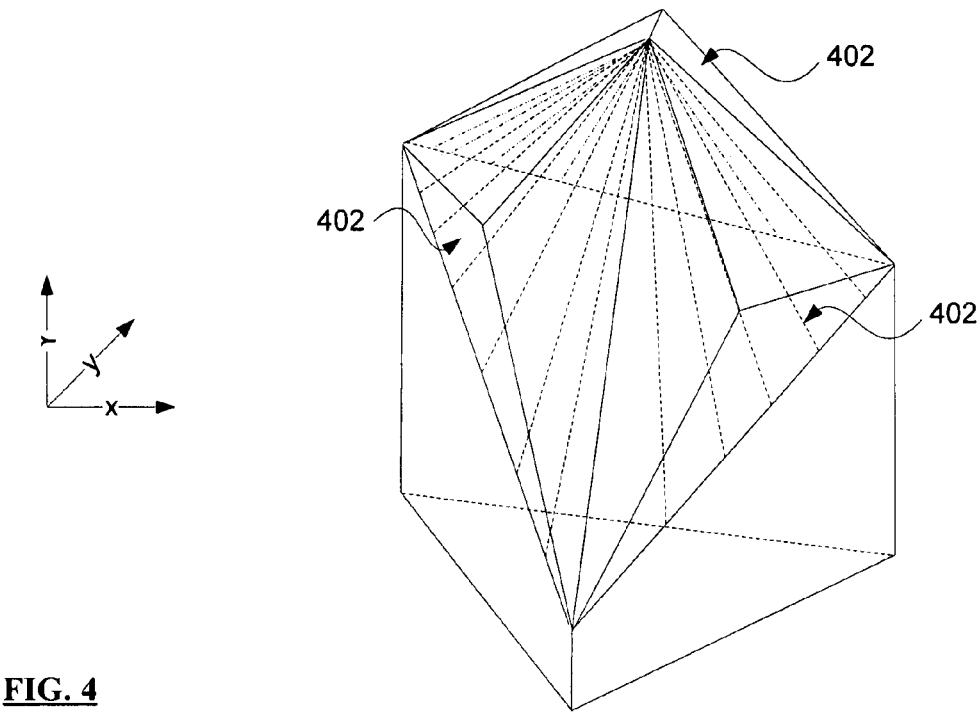
FIG. 4 provides a pictorial representation comparing the gamuts of FIGS. 2 and 3.

FIG. 4 illustrates gamut 200 superimposed on gamut 300. As can be seen, factoring other colors as discussed above provides a gamut 300 which covers a broader range of intensities 402 of which the lighting system is capable of generating. However, as discussed further below, an lighting system which is set according to gamut 300, for example, would require greater computation to determine whether or not an input color parameter is within the gamut.

The lighting system such as that illustrated by FIG. 1 may be set to output light that has a coordinate in the 3-d system that is within the gamut 200 or 300 or similar shaped gamut. In fact, the technique discussed below and exemplary fixture geometry discussed herein may be used with any appropriate type of sources of radiant electromagnetic energy. Exemplary sources of radiant electromagnetic energy include various conventional forms of incandescent, arc, neon and fluorescent lamp. Typically, at least some of the sources take the form of solid state light emitting elements. As discussed herein, solid state light emitting elements essentially includes any of a wide range light emitting or generating device formed from organic or inorganic semiconductor materials. Examples of solid state light emitting elements include semiconductor laser devices. Many common examples of solid state lighting elements are classified as a different types of "light emitting diodes" or "LEDs." This class of devices encompasses any and all types of semiconductor diode devices that are capable of receiving an electrical signal and producing a responsive output of electromagnetic energy. Thus, the term "LED" should be understood to include light emitting diodes of all types, light emitting polymers, organic diodes, and the like. LEDs may be individually packaged, as in the illustrated examples. Of course, LED based devices may be used that include a plurality of LEDs within one package, for example, multi-die LEDs that contain separately controllable R, G and B LEDs within one package. Those skilled in the art will recognize that "LED" terminology does not restrict the source to any particular type of package for the LED type source. Such terms encompass LED devices that may be packaged or non-packaged, chip on board LEDs, surface mount LEDs, and any other configuration of the semiconductor diode device that emits light. Solid state lighting elements may include one or more phosphors and/or nanophosphors based upon quantum dots, which are integrated into elements of the package or light processing elements to convert at least some radiant energy to a different more desirable wavelength.

The color of light or other electromagnetic radiant energy relates to the frequency and wavelength of the radiant energy and/or to combinations of frequencies/wavelengths contained within the energy. Many of the examples relate to colors of light within the visible portion of the spectrum, although the teachings may also apply to systems that utilize or emit other energy.

It also should be appreciated that solid state light emitting elements may be configured to generate electromagnetic radiant energy having various bandwidths for a given spectrum (e.g. narrow bandwidth of a particular color, or broad bandwidth centered about a particular), and may use different configurations to achieve a given spectral characteristic. For example, one implementation of a white LED may utilize a number of dies that generate different primary colors which combine to form essentially white light. In another implementation, a white LED may utilize a semiconductor that generates light of a relatively narrow first spectrum that acts as a pump. The light from the diode "pumps" a phosphor material or quantum dots contained in the LED package, which in turn radiates a different typically broader spectrum of light that appears relatively white to the human observer.

Figure 5:
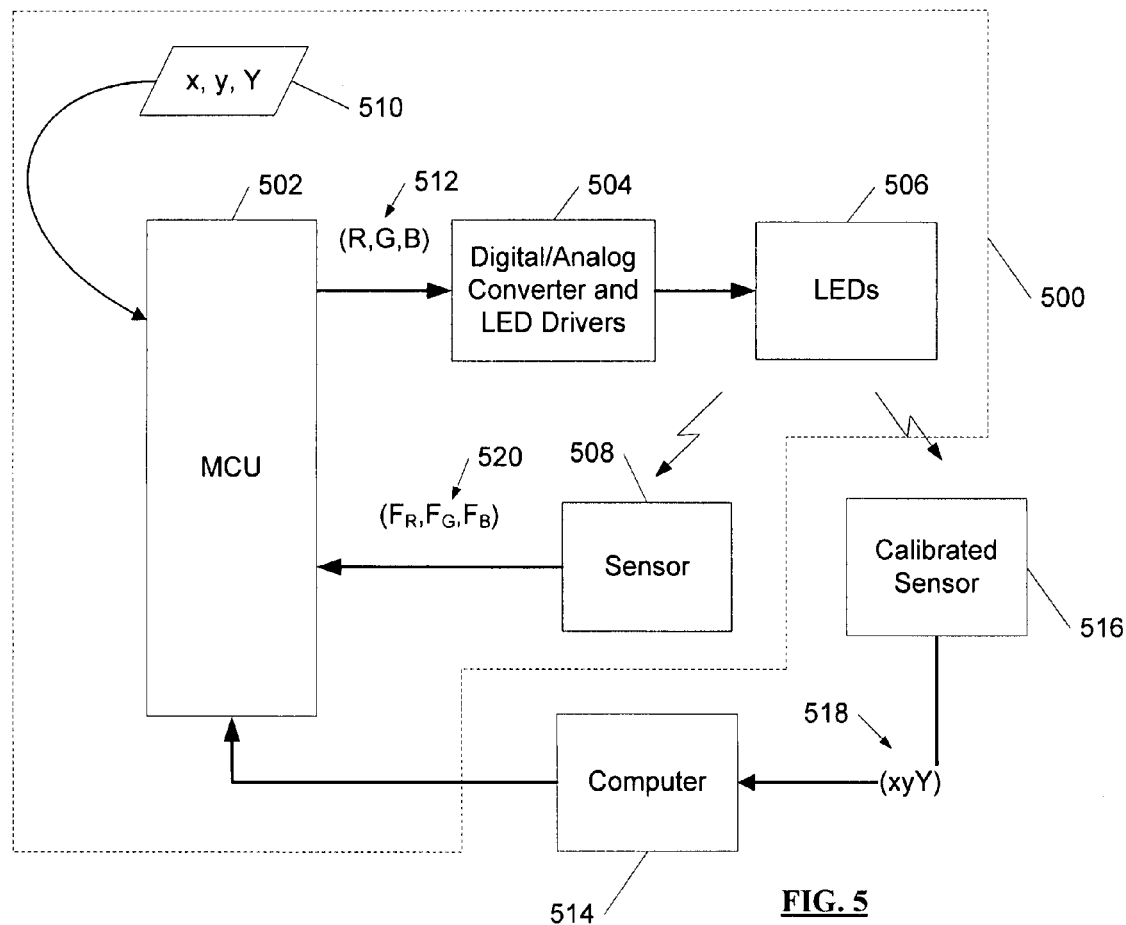
FIG. 5 illustrates an example of electrical components of a solid state lighting system and components for setting the solid state lighting system.

FIG. 5 illustrates a high-level block diagram of a lighting system 500 and sensors used to control and set the lighting system 500. Specifically, the lighting system 500 includes a microcontroller unit 502 which controls the digital-to-analog converters and LED drivers 504 for controlling the LED light sources 506. The system 500 which outputs combined light (examples of the manner in which the set of LED light sources 100 output combined light is discussed above with FIG. 1). In a system 500 intended to produce a wide variety of combined light output colors, the set of LEDs 506 will include one or more LEDs of each of two, three or more light colors. At least for each different color of the LEDs, there will be an associated digital-to-analog converter and LED driver to control the output amount of that color of light. While FIG. 1 illustrates LED light sources 506, typically red (R), green (G) and blue (B) LEDs, it should be appreciated that other solid state light emitting elements could be used as described above. The lighting system 500 also includes a sensor 408 discussed below.

It is useful to set the lighting system 500 of FIG. 5 according to its operational limitations because when the input 510 is applied to the LED light sources 506 in RGB coordinates 512, the spectral output of each LED light source 506 tends to be slightly different from fixture to fixture as compared to the desired output represented by the input 510. Specifically, the color of light output by combination of light from the LED light sources 506 may be different from the desired color represented by the input 510 for the reasons described above.

Also, it should be appreciated that while FIG. 5 illustrates an input 510 in chromaticity coordinates xyY, the input may be tristimulus values XYZ or even RGB values. An input 510 of RGB values may be applied to the MCU 502 or directly to the digital and analog converter and LED drivers 504. However, for explanation purposes, this description refers to the color and/or intensity input setting values 510 in chromaticity coordinates xyY applied to the MCU 502. In operation, the color input setting 510 may come from a user interface device or a central control system; although during calibration or setting up the system, the input settings 510 may be automatically input, e.g. by computer 514.

In FIG. 5, setting up the lighting system may be achieved by interfacing a calibrated sensor 516 and computer 514 with the lighting system 500. The sensor 516 is configured to sense and measure intensity of the spectral output of the LED light sources 506, and output measurements 518 containing at least intensity (Y) measurements. The sensor may be configured to measure chromaticity (x,y) as well. However, it should be appreciated that measurements may be taken in or converted to tristimulus coordinates, such as XYZ or other coordinates that take into account various color sensitivity functions which correlate generally with the response to the human eye and converted to an intensity value. The computer 514 receives measurements from the sensor 516.

Using the measurements 518 output by the sensor 516, the computer 514 determines a gamut of chromaticity and intensity values in which the system 500 is capable of generating. For example, for ease of computation, the gamut may be represented by a formation of intersecting planes, as illustrated by FIGS. 2 and 3. Points in the 3-d coordinate system representing the formation may be loaded into the MCU 502 or stored in external memory (not shown) for use when the system 500 is in actual operation to determine whether or not an input 510 can be displayed by the given optical system. The particulars of the measurements taken will be discussed further below.

Figure 6:
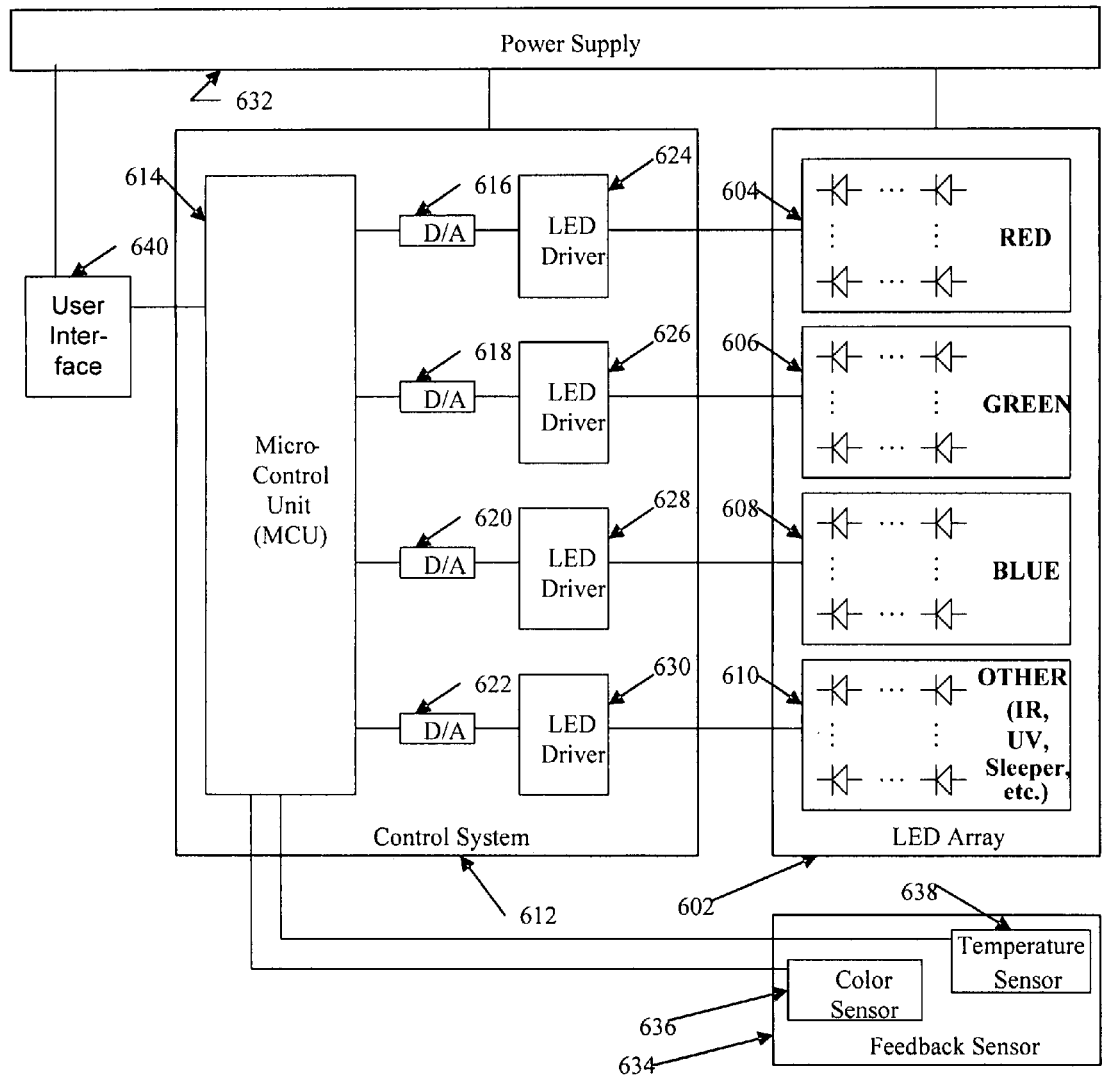
FIG. 6 illustrates a block diagram of the control circuitry for a solid state lighting system in accordance with the disclosed concepts.
Figure 7:
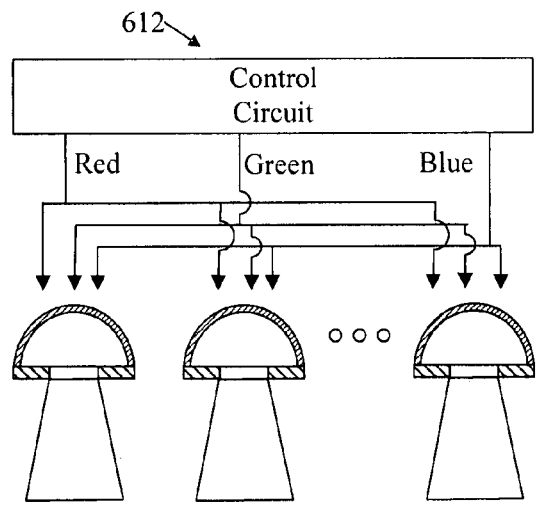
FIG. 7 illustrates a first exemplary configuration of control circuitry for controlling a plurality of light fixtures.
Figure 8:
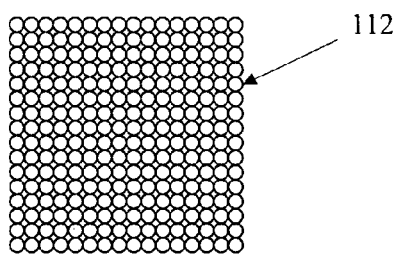
FIG. 8 illustrates an array of outputs of a number of light fixtures.
Figure 9:
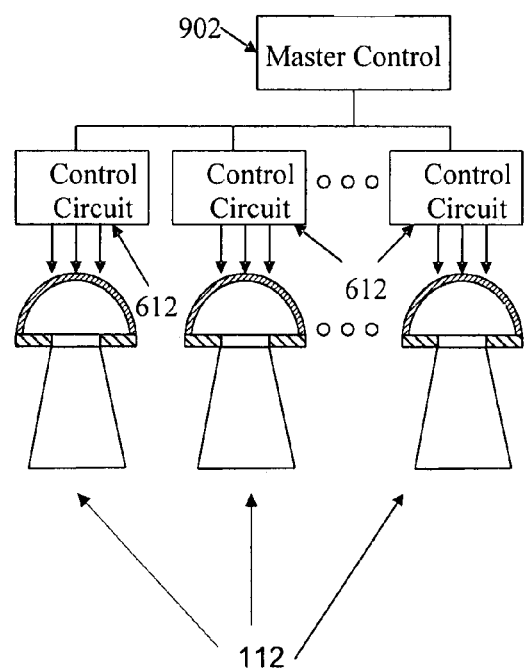
FIG. 9 illustrates a second exemplary configuration of control circuitry for controlling a plurality of light fixtures.

FIG. 6 illustrates a block diagram of the control circuitry for a lighting system in accordance with the disclosed concepts. In the circuit of FIG. 6, the set of sources of light of the various types takes the form of a LED array 602 containing the plurality of LEDs 1110 forming the fixture 112 such as that illustrated by FIG. 1. The control circuitry of FIG. 6 may control a plurality of fixtures 112 in various configurations such as that illustrated by FIG. 8. However, it should be appreciated that many other configurations of the plurality of fixtures 112 are indeed possible. Also, as illustrated by FIG. 7, the control circuitry 612 separately controls the plurality of Red LEDs, the plurality of Green LEDs, the plurality of Blue LEDs, etc. (discussed below) in the plurality of fixtures 112. Alternatively, as illustrated by FIG. 9, the system may include a plurality of control circuits 612 each for controlling a respective fixture 112 among a plurality of light fixtures 112. In this configuration, master control circuitry 902 may be used to control the plurality of the control circuits 612. However, it should be appreciated that the control circuitry discussed herein is applicable in many different arrangements where the control circuitry controls multiple sets of LEDs or dedicated control circuitry controls each one of a plurality of sets of LEDs.

Turning back to FIG. 6, the LED array 602 comprises two or more LEDs of each of the three primary colors red (R), green (G) and blue (B), each of which is represented by LED blocks 604, 606 and 608. As discussed above, these LED blocks may connect to one fixture 112 or span a plurality of such fixtures 112. Either configuration is possible. Moreover, the array 602 is not limited to RGB LEDs. White LEDs also may be included, or white LEDs of two or more different color characteristics may be substituted for the RGB LEDS.

The LED array 602 may also include a number of additional or 'other' LEDs 610. For example, the LED array 602 may include white, IR or UV LEDs for various purposes or additional LEDs as "sleepers" that initially would be inactive. For example, using the circuitry of FIG. 6 as an example, the Red LEDs 604, Green LEDs 606 and Blue LEDs 608 might normally be active. The LEDs 610 would be sleeper LEDs, typically including one or more LEDs of each color used in the particular system. Sleeper LEDs may be activated when needed, typically in response to feedback indicating a need for increased output (e.g. due to decreased performance of the originally active LEDs).

The electrical components shown in FIG. 6 also include a LED control system 612. The control system 612 includes LED driver circuits 624, 626, 628, 630 for the various LEDs as well as a microcontroller 614. The microcontroller 614 controls the LED driver circuits 624, 626, 628, 630 via digital-to-analog (D/A) converters 616, 618, 620, 622. More particularly, the driver circuit 624 drives the Red LEDs 604; the driver circuit 626 drives the green LEDs 606; and the driver circuit 628 drives the Blue LEDs 608. In a similar fashion, when active, the driver circuit 630 provides electrical current to the other LEDs 610. If the other LEDs provide another color of light, and are connected in series, there may be a single driver circuit 630. If the LEDs are sleepers, it may be desirable to provide a separate driver circuit 630 for each of the LEDs 610. The intensity of the emitted light of a given LED 604, 606, 608, 610 is proportional to the level of current supplied by the respective driver circuit 624, 626, 628, 630. The current output of each driver circuit is controlled by the higher level logic of the system.

The driver circuits 624, 626, 628, 630 supply electrical current at the respective levels for the individual sets of LEDs 604, 606, 608, 610 to cause the LEDs 604, 606, 608, 610 to emit light. For example, the microcontroller 614 controls the LED driver circuit 624 via a D/A converter 616, and the microcontroller 614 controls the LED driver circuit 626 via a D/A converter 618. Similarly, the microcontroller 614 controls the LED driver circuit 628 via a D/A converter 620. The amount of the emitted light of a given LED set 604, 606, 608 is related to the level of current supplied by the respective driver circuit 624, 626, 628.

In a similar fashion, the microcontroller 614 controls the LED driver circuit 630 via the D/A converter 622. When active, the driver circuit 630 provides electrical current to the other LEDs 610. If the LEDs are sleepers, it may be desirable to provide a separate driver circuit and D/A converter pair, for each of the LEDs 610 or for other sets of LEDs of the individual primary colors.

The LED driver circuits 624, 626, 628, 630, the D/A converters 616, 618, 620, 622 and the microcontroller 614 receive power from a power supply 632, which is connected to an appropriate power source (not separately shown). For most illumination applications, the power source will be an AC line current source, however, some applications may utilize DC power from a battery or the like. The power supply 632 provides AC to DC conversion if necessary, and converts the voltage and current from the source to the levels needed by the LED driver circuits 624, 626, 628, 630 the D/A converters 616, 618, 620, 622 and the microcontroller 614.

In operation, taking as example the operation of the Red LED 604, the D/A converters 616 receives a command for a particular level from the microcontroller 614. In response, the converter 616 generates a corresponding analog control signal, which causes the associated LED driver circuit 624 to generate a corresponding power level to drive the Red LED 604. The Red LED 604 in turn outputs light of a corresponding intensity. The D/A converter 624 will continue to output the particular analog level, to set the red LED 604 intensity in accord with the last command from the microcontroller 614, until the microcontroller 614 issues a new command to the D/A converter 616. The other D/A converters 618, 620, 622, the LED driver circuits 626, 628, 630 and LEDs 606, 608, 610 operate in a similar fashion.

The example uses current control, to control the amount of light output of each block of LEDs, and thus the light contribution thereof to the combined light output of the system. Those skilled in the art will recognize that other control techniques may be used, such as various forms of controlled pulse modulation.

Though not illustrated, the microcontroller 614 typically includes or has coupled thereto random-access memory (RAM) for storing data and read-only memory (ROM) and/or electrically erasable read only memory (EEROM) for storing control programming and any pre-defined operational parameters. The microcontroller 614 itself comprises registers and other components (not shown) for implementing a central processing unit (CPU) and possibly an associated arithmetic logic unit (not shown). The CPU implements the program to process data in the desired manner and thereby generate desired control outputs.

The microcontroller 614 is programmed to control the LED driver circuits 624, 626, 628, 630 to set the individual output intensities of the LEDs to desired levels, so that the combined light emitted from the aperture 108 of the cavity 102 has a desired spectral characteristic and a desired overall intensity. The microcontroller 614 may be programmed so that when it receives control inputs via a user interface 640 specifying the particular color, it translates color input values into appropriate control values, as discussed further below. For discussion purposes, the user interface 640 is shown as an element of the system closely associated with the microcontroller 614 and other electrical elements of the lighting system. However, those skilled in the art will recognize that the system may include a communication interface or other link to a remote device or to some other system that provides the user interface (see e.g. above-incorporated U.S. Pat. No. 6,995,355 to Rains, Jr. et al., for additional information).

To insure that the desired mixture is maintained, the microcontroller 614 receives information concerning the light output from a feedback sensor 634. The feedback sensor 634 may include a color sensor 636 which measures the frequency distribution (e.g. intensity of multiple frequency components) of the combined light. Other types of feedback sensors, such as a thermal temperature sensor 638 may be used, for example, in or near the optical integrating cavity 102. While the feedback sensor 634 as illustrated includes both a thermal temperature sensor 638 and the color sensor 636, the feedback sensor 634 may contain only one or the other. Although not separately shown, the system may include a separate intensity sensor, or the microcontroller may control the sensor 636 to also provide an overall indication of intensity.

If provided, the thermal temperature sensor 638 may be a simple thermoelectric transducer with an associated analog to digital converter, or a variety of other temperature detectors may be used.

The color sensor 636 detects color distribution in the integrated light within the optical integrating cavity 102. The sensor 636 may be mounted on the same board as one or more of the LEDs, or as in the example of FIG. 1, the sensor 636 may be coupled to a wall of the cavity. Some small amount of the integrated light passes through a point on a wall of the cavity 102, therefore it is sufficient to sense color at that point on the cavity wall. A variety of color sensing devices may be used to implement the sensor 636.

In the current example, the microcontroller 614 monitors color using an RGB light sensor 636 that is a digital compatible sensor which provides a single output in the form of a pulse train of a frequency that is proportional to the intensity of the input light. Additionally, the color sensor 636 may incorporate selectable color filtering. In such a case, the sensor applies one of the color filters for color of light to be sensed in response to several bits of a control signal from the microcontroller 614. The frequency of the output then is proportional to the sensed light intensity of the selected color of light (R, G or B).

For example, the microcontroller 614 may select a color and instruct the color sensor 636 to sense the intensity of that color through the appropriate filter, and as a result, the microcontroller 614 receives a pulse train of frequency proportional to the measured intensity of light of the selected color. The microcontroller 614 then selects another color and receives a pulse train of frequency proportional to the measured intensity of light of that second color. The microcontroller 614 then selects a third color and receives a pulse train of frequency proportional to the measured intensity of light of that third color. In this way, the sensor 636 can provide information to the microcontroller 614 as to the measured intensity of each primary color of light (R, G or B) within the combined light being generated by the system. The microcontroller 614 may also control the sensor 636 to obtain a similar reading of total intensity (unfiltered) of the combined light. The process may periodically repeat as the system takes additional measurements of the color distribution.

The control circuit 612 and specifically the microcontroller 614 is capable of setting the drive current and thus the output intensity for each color, in order to achieve a desired uniform color distribution in the combined light generated further to a process described in detail below. Briefly, the microcontroller 614 translates frequency of the signals from the color sensor 636 into data that it uses as a representation of intensity for each sensed color of light. The microcontroller 614 uses the color intensity data as feedback data, to control the DACs to set the drive current value for each color, to insure that the combined light generated by the system exhibits and maintains the desired color distribution. In a system sleeper LEDs as discussed above, the microcontroller 614 also is responsive to the detected color distribution to selectively activate the inactive light emitting diodes 614 as needed, to maintain the desired color distribution in the combined light.

While FIG. 6 provides a detailed diagram of a lighting system, the remainder of the description will refer to the high-level block diagram illustrated by FIG. 5. As illustrated generally by FIG. 5, an (x,y,Y) point 510 may be input to an MCU 502. The MCU 502 interprets and executes the input point 510 to generate a desired color and intensity corresponding to the (x,y,Y) point 510. The first step is to insure that the input 510 is achievable on the fixture. In other words, it needs to be determined whether or not the (x,y,Y) input 510 is within a gamut, discussed above. In practice, each of the important coordinates of the points described in the previous section is measured while determining operational characteristics of the lighting system Validating input 510 can be broken into two general steps. First, the chromaticity of the corresponding (x,y) coordinate is validated. Then, the intensity of the (Y) coordinate is validated. If both steps are valid, then the point has been validated as an achievable point. If achievable, the MCU sets the LED outputs to corresponding levels. If not achievable, there are a variety possible ways the MCU might proceed, examples of which are discussed later.

Figure 10:
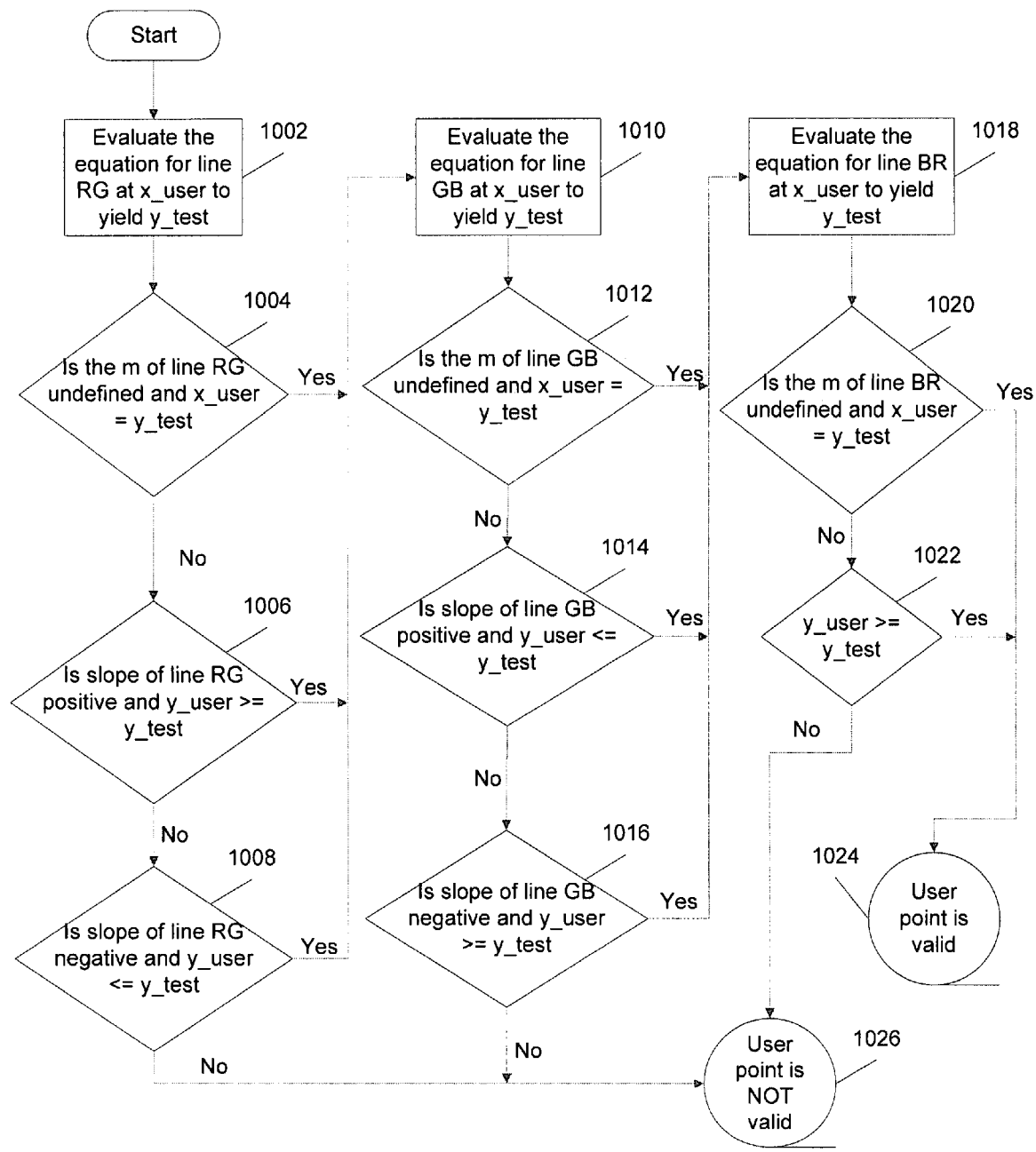
FIG. 10 illustrates the processing flow for validating a given chromaticity corresponding to an input setting to the solid state lighting system described herein to determine if the lighting system is capable of generating light having the given chromaticity.

To validate the chromaticity, it should be shown that the (x,y) coordinates of the input 510 are within the gamut, such as the exemplary gamuts 200, 300 described above. This can be accomplished by comparing the input 510 coordinates to the lines which are defined the intersection of each of the plurality of planes forming the gamut or the edge of each facet. Specifically, the points that define these lines have been pre-programmed in the fixture and are accessible for validating any given input 510. FIG. 10 illustrates an exemplary flow chart for validating such an input 510. Since the (x,y) coordinates of the input 510 are the only coordinates being considered at this stage, the lines to which to compare the input 510 corresponds to those that form the footprint of the gamut in FIGS. 2 and 3. These lines are as follows: (1) line formed by points 202 and 206 ("GB line"), (2) line formed by points 206 and 208 ("BR line"), and (3) line formed by points 208 and 202 ("RG line").

FIG. 10 illustrates a flowchart of the algorithm to evaluate chromaticity on the input 510. However, the order in which the lines are evaluated is not important. In the flowchart, "x_user" corresponds to the x-coordinate of the input 510, "y_user" corresponds to the y-coordinate of the input 510, "m" corresponds to the slope of the line in the 3-d coordinate system to which the input 510 is compared, and "y_test" corresponds to the y value result solved for Equation 1 discussed below. Moreover, the algorithm represented by the flowchart of FIG. 10 assumes that the red and blue points have a smaller y-coordinate than the green point, and the blue point has a smaller x-coordinate than the red point. Basically, the algorithm assumes that the red point resides in the reddish region of the CIE 1931 Chromaticity Diagram or 3-d coordinate system, the green point resides in the greenish region of the diagram and the blue point resides in the bluish region of the diagram, as discussed above.

The general equation for the lines in the x-y plane forming the gamuts 200, 300 of FIGS. 2 and 3, respectively is shown in Equation 1 below. Coordinates $(x_1,y_1)$ and $(x_2,y_2)$ are the end points of the lines forming the gamut in the x-y plane, i.e., the GB line, BR line or RG line, and $(y_2-y_1)/(x_2-x_1)$ corresponds to the slope "m."

$$y = \frac{y_2 - y_1}{x_2 - x_1}(x - x_1) + y_1 \quad \text{Equation 1}$$

For the ease of explanation, consider the following example where point 202 has the coordinate (2,6), point 206 has the coordinate (1,1), point 208 has the coordinate (5,2), and the (x,y) input 510 to be validated has the coordinate (2,4). Thus, the GB line with the foregoing coordinates would have a slope "m" of 5 on the x-y plane. The BR line with the foregoing coordinates would have a slope "m" of ¼ on the x-y plane. The RG line with the foregoing coordinates would have a slope "m" of -⅔ on the x-y plane.

According to FIG. 10, in step 1002, Equation 1 is evaluated for the RG line. Following the exemplary coordinates described above, y_test (or the output of Equation 1) would equal 6. In step 1004, x_user is evaluated when slopes of lines are undefined. In the case of the RG line, the slope of -⅔ is not an undefined quantity. Accordingly, the result of step 1004 would be false or no. In Step 1006, y_user is evaluated when the slope is positive. In the case of the RG line, the slope of -⅔ is a negative value. Accordingly, the result of step 1006 would be false or no. In step 1008, y_user is evaluated when the slope is negative. In this case, the slope of -⅔ is indeed a negative value. Thus, it is determined whether or not y_user is less than or equal to the y_test. In the case of the RG line where y_user=4 and y_test=6, the result of step 1008 is true. Accordingly, the user point of (2,4) is within the gamut when compared with the RG line only.

In order to make the determination whether or not the input 510 falls within the gamut, steps similar to steps 1002-1008 need to be repeated for the GB and BR lines.

According to FIG. 10, in step 1010, Equation 1 is evaluated for the GB line. Following the exemplary coordinates described above, y_test (or the output of Equation 1) would equal 6. In step 1012, because the slope of 5 for line GB is not an undefined value, the result would be false. In step 1014, because the slope has positive value, y_user and y_test are evaluated. Specifically, in step 1014, it is determined whether or not y_user is less than or equal to y_test. Because 4 (y_user) is less than 6 (y_test), the result of step 1014 is true or yes, and the next step is to evaluate line BR. Had the result of step 1014 been false, step 1016 would have been conducted where if the slope of the GB line is negative, it is determined whether or not y_user is greater than or equal to y_test.

According to FIG. 10, in step 1018, Equation 1 is evaluated for the BR line. Following the exemplary coordinates described above, y_test (or the output of Equation 1) would equal ⅝. In step 1020, because the slope of ¼ for line BR is not an undefined value, the result would be false. Next, in step 1022, it is determined whether or not y_user is greater than or equal to y_test. It is not necessary to determine whether or not the slope is positive or negative because the position of the input 510 has already been evaluated for the other lines. Because 4 (y_user) is greater than ⅝ (y_user), the result of step 1022 is true. Accordingly, the input 510 is inside the gamut for coordinates (x,y), and the user set point is considered valid at step 1024 for the (x,y) coordinates.

Had the input 510 been outside the gamut, step 1026 would have resulted. As shown in the flowchart, step 1026 may be reached when it is determined that the point 510 corresponds to a position on a side of the RG line, the GB or the BR line that places the point outside of the gamut in the x-y plane.

Once it is known that the (x,y) coordinate of input 510 is within the gamut 200, 300, the intensity of the input 510 needs to be validated. As can be seen from the gamut 200, 300 illustrations of FIGS. 2, 3, respectively, the maximum intensity for any given chromaticity in the gamut 200, 300 is governed by a series of planes. Each plane is defined by three points, where the white point is common among all planes corresponding to point 212 which is the apex of the gamut 200, 300.

An algorithm with some similarities to the validation of chromaticity as discussed above can be made for validating intensity. However, the plurality of planes that form the top of the gamut 200, 300 will be evaluated. Specifically, referring to FIG. 2, the fifth plane 222, sixth plane 224 and/or seventh plane 226 will be evaluated to determine whether or not the input 510 is positioned under the respective planes. It is not necessary to evaluate the first plane 214, second plane 216 and third plane 217 since the RG, GB and BR lines evaluated in accordance with FIG. 10 are within these planes. Also, it is not necessary to evaluate plane 220 where Y=0 because intensity cannot have a negative value.

With respect to FIG. 3, the following planes will be evaluated: (1) plane with points 210, 212, 311 ("$RWY_{max}$ plane"); (2) plane with points 204, 212, 311 ("$GWY_{max}$ plane"); (3) plane with points 204, 212, 304 ("$GWC_{max}$ plane"); (4) plane with points 207, 212, 304 ("$BWC_{max}$ plane"); (5) plane with points 207, 212, 308 ("BWM$_{max}$ plane"); and (6) plane with points 210, 212 and 308 ("RWM$_{max}$ plane"), where R stands for red, G for green, B for blue, W for white, Y for yellow, C for cyan and M for magenta on the 3-d coordinate space of FIG. 3. In other words, the RWY$_{max}$ plane corresponds to the facet at the top of the gamut 300 that spans the red, white and yellow colors, and so on for each respective plane.

Figure 11A:
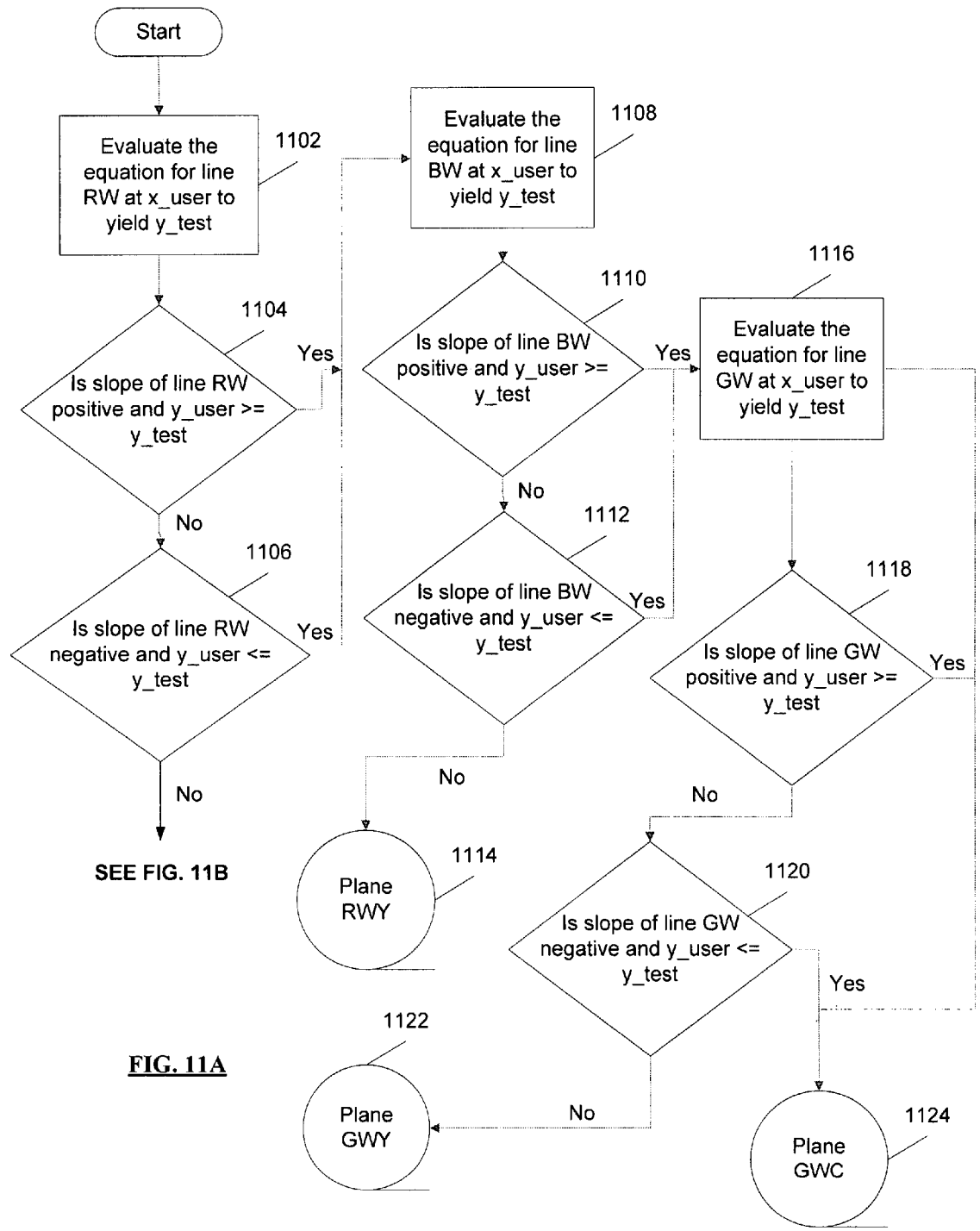
FIGS. 11A and B illustrate the processing flow for validating a given intensity corresponding to an input setting to the solid state lighting system described herein to determine if the solid state lighting system is capable of generating light having the given intensity.
Figure 12:
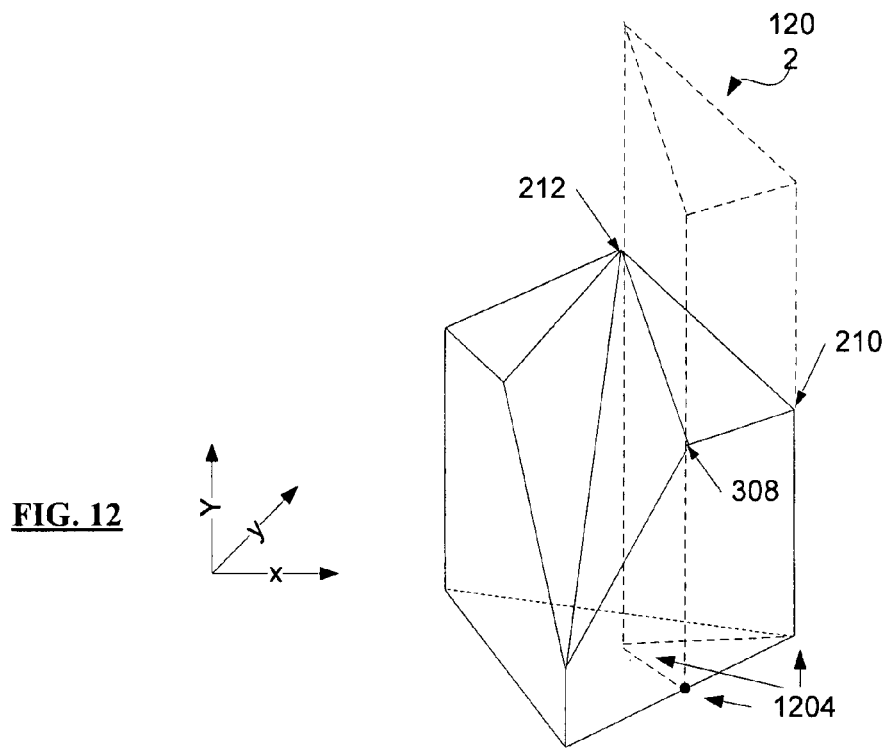
FIG. 12 provides a partial pictorial representation of the gamut of FIG. 3 for illustrating which planes of the gamut are evaluated for a given input of chromaticity and intensity.
Figure 13:
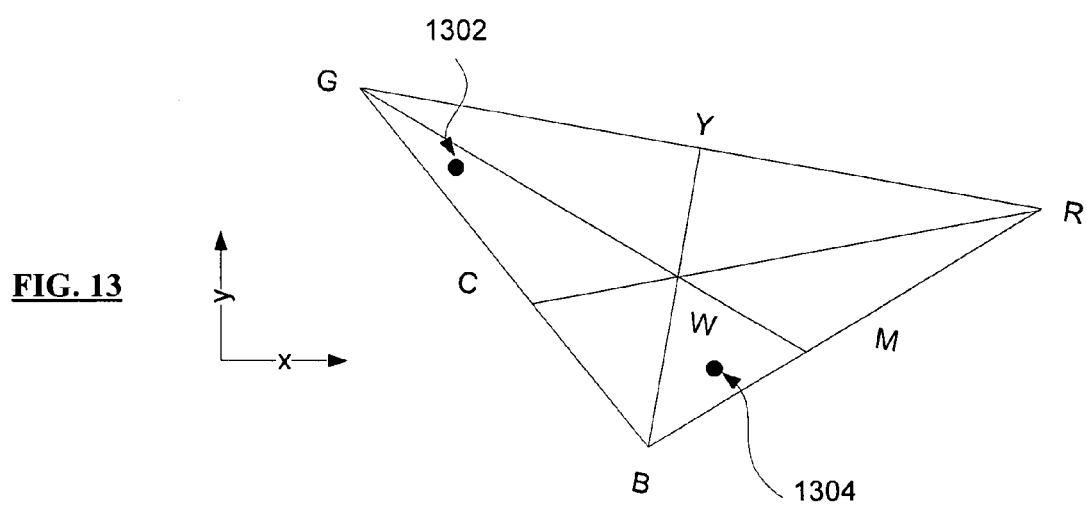
FIG. 13 provides a partial pictorial representation of the gamut of FIG. 3 in the x-y plane for illustrating which planes of the gamut are evaluated for a given input of chromaticity and intensity.

In FIG. 11A and B, it is determined which of the foregoing planes apply to the chromaticity of the input 510. FIG. 12 is a partial illustration of the gamut 300 for describing conceptually the determination of which plane applies according to the flowchart of FIGS. 11A and B. Each plane that forms the top of the gamut 300 can be contained within separate columns extending along the Y axis. Taking the RWM$_{max}$ plane for example, a column may be formed along the Y axis where each point 210, 212, 308 is in line with a respective vertices 1204 of the column. When it is determined that the RWM$_{max}$ plane applies to the (x,y) input according to the flowchart of FIGS. 11A and B, the (x,y) point is inside the column 1202. A determination of which plane applies can be accomplished by comparing the input 510 to the lines which describe the intersections of planes RWY$_{max}$, GWY$_{max}$, etc. described above as projected on to the x-y plane in the 3-d coordinate. For example, the line from point 210 to point 212 ("RW$_{max}$ line") in the gamut 300 can be represented as the RW line which is projected on the x-y plane by ignoring the Y coordinate and using Equation 1 discussed above. FIG. 13 illustrates a projection of each of the RWY$_{max}$ plane, GWY$_{max}$ plane, GWC$_{max}$ plane, BWC$_{max}$ plane, BWM$_{max}$ plane, and RWM$_{max}$ plane as projected on the x-y plane of the gamut 300. By examining these projected planes according to the flowchart of FIGS. 11A and B, it is possible to determine which plane applies.

For explanation purposes, as illustrated by FIG. 13 consider a first (x_user, y_user) point 1302 and a second (x_user, y_user) point 1304 that are input to the system (input 510) as illustrated by FIG. 5. Because the RW line and CW line are part of the same line, the results of steps 1104 and 1106 may rule out planes that do not apply. The first point 1302 would have a y_user coordinate that places the point 1304 above the RW and CW lines. Thus, the RWM$_{max}$ plane, BWM$_{max}$ plane and BWC$_{max}$ plane do not apply. Steps 1108-1124 of FIG. 11A would be performed to determine which plane applies. Conversely, the second point 1304 would have a y_user coordinate that places the point 1302 below the RW and CW lines as illustrated. Thus, the RWY$_{max}$ plane, GWY$_{max}$ plane and GWC$_{max}$ plane do not apply. Steps 1126-1142 of FIG. 11B would be performed to determine which plane applies.

For explanation purposes, consider the first point 1302 for determining which plane applies according to FIG. 11A. In step 1102 of FIG. 11A, Equation 1 is evaluated for the RW line at x_user to yield the result as y_user. As shown, the slope of line RW is positive and is an extension of line CW. Based on the position of point 1302 illustrated by FIG. 13, the y_user would be greater than or equal to the y_test value—the result of step 1302 would be true or yes. On the other hand, assuming that the slope of line RW is negative, the y_user value would be less than or equal to the y_test value—the result of step 1304 would be true or yes. Based on these determinations the BWC$_{max}$ plane, RWM$_{max}$ plane and BWM$_{max}$ plane would be ruled out. The steps of 1108-1112 are the same as steps 1102-1108 except for evaluation of the BW line. If the results of both steps 1110 and 1112 are false or no, the determination is made that the (x_user, y_user) is applicable to the RWY$_{max}$ plane. However, this would not be the case for point 1302 in this example. In other words, if either of steps 1110 or 1112 are true, step 1116 would be performed.

Again, the steps of 1106-1120 are the same as steps 1102-1108 except for evaluation of the GW line. If the results of both steps 1118 and 1120 are false or no, the determination is made that the (x_user, y_user) is applicable to the GWY$_{max}$ plane. However, this would not be the case for point 1302 in this example. In other words, if either of steps 1110 or 1112 are true, it would be determined that GWC$_{max}$ plane is applicable.

Figure 11B:
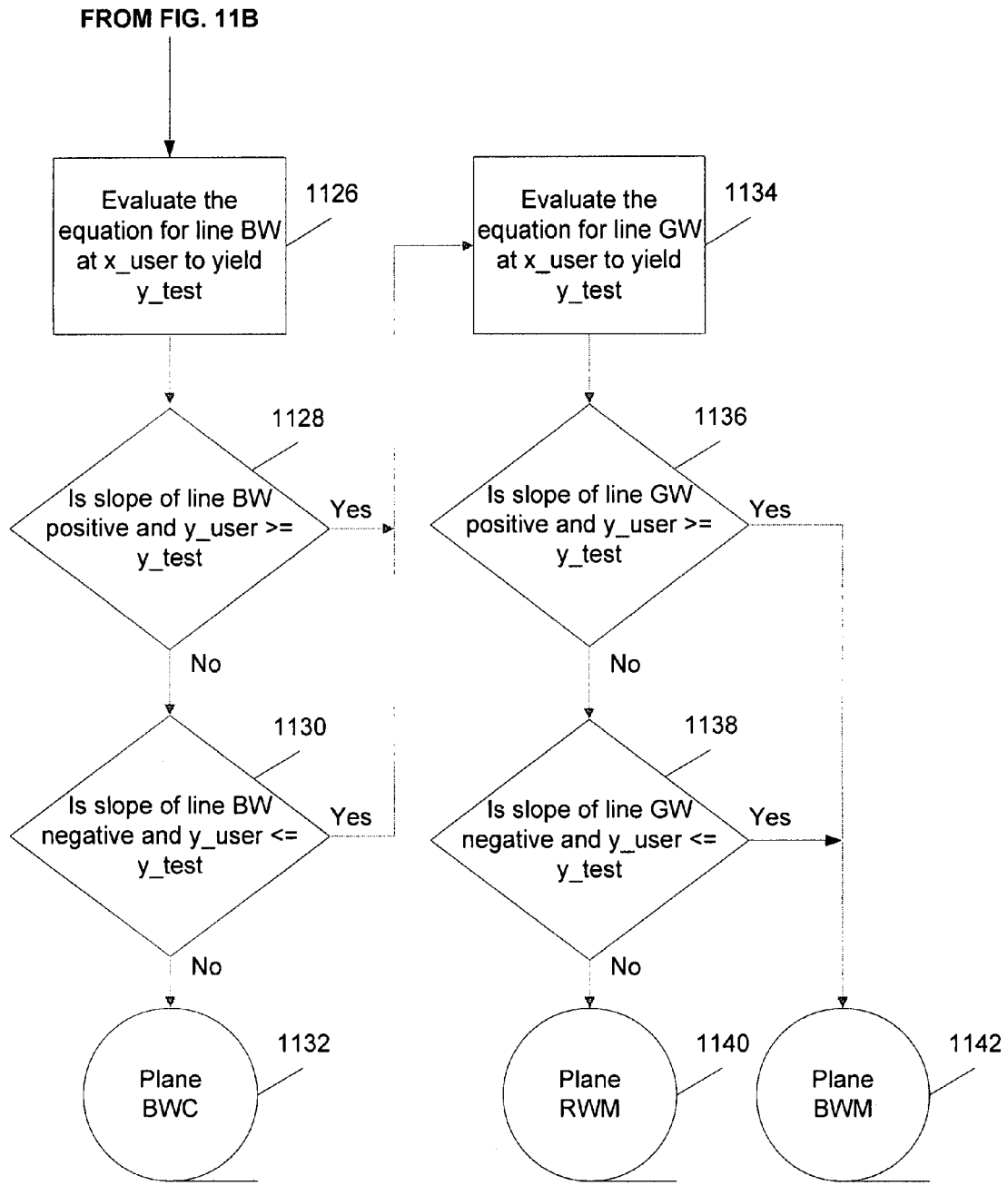

For explanation purposes, consider the first point 1304 for determining which plane applies according to FIG. 11B. In step 1102 of FIG. 11A, Equation 1 is evaluated for the RW line at x_user to yield the result as y_user. As shown, the slope of line RW is positive and is an extension of line CW. Based on the position of point 1304 illustrated by FIG. 13, the y_user would be less than the y_test value—the result of step 1302 would be false or no. Also, the result of step 1106 would be false. Based on these determinations the RWY$_{max}$ plane, GWY$_{max}$ plane and GWC$_{max}$ plane would be ruled out.

The steps of 1126-1130 are the same as steps 1102-1108 except for evaluation of the BW line. If the results of both steps 1128 and 1130 are false or no, the determination is made that the (x_user, y_user) is applicable to the BWC$_{max}$ plane. However, this would not be the case for point 1304 in this example. In other words, if either of steps 1128 or 1130 are true, step 1134 would be performed.

Again, the steps of 1134-1138 are the same as steps 1102-1108 except for evaluation of the GW line. If the results of both steps 1136 and 1138 are false or no, the determination is made that the (x_user, y_user) is applicable to the RWM$_{max}$ plane. However, this would not be the case for point 1304 in this example. In other words, if either of steps 1136 or 1138 are true, it would be determined that BWM$_{max}$ plane is applicable.

Upon the determination of which plane applies to the chromaticity of the input 510 (x_user, y_user), the next step is to compare the intensity of the input 510 to the maximum achievable intensity for the lighting system described by the appropriate plane. As discussed above, the maximum achievable intensity corresponds to the apex at point 212 of the gamut 200, 300 for white line. However, each (x,y) point in the gamut 200, 300 has a specific maximum intensity because the planes that form the top of the gamut 200, 300 traverse the x,y,Y space, i.e., the Y value of each plane is not constant.

As discussed above, the applicable plane determined according to the flowchart of FIGS. 11A and B may be any of the RWY$_{max}$ plane, GWY$_{max}$ plane, GWC$_{max}$ plane, BWC$_{max}$ plane, BWM$_{max}$ plane and RWM$_{max}$ plane. Each of the foregoing planes may be defined according to three points. For example, the BWM$_{max}$ plane may be defined by points 207, 308 and 212 as illustrated by FIG. 3. These three points which define the applicable plane may be used to evaluate if the maximum achievable intensity for the chromaticity (x$_{user}$, y$_{user}$) input 510 by the user according to Equation 2 shown below.

$$\det \begin{bmatrix} x_{user} - x_1 & y_{user} - y_1 & Y_{max} - Y_1 \\ x_2 - x_1 & y_2 - y_1 & Y_2 - Y_1 \\ x_3 - x_1 & y_3 - y_1 & Y_3 - Y_1 \end{bmatrix} = 0 \qquad \text{Equation 2}$$

In Equation 2, Y$_{max}$ represents the maximum achievable intensity at the chromaticity (x$_{user}$,y$_{user}$) input 510. The points (x$_1$,y$_1$,Y$_1$), (x$_2$,y$_2$,Y$_2$), and (x$_3$,y$_3$,Y$_3$) are the points found as a result of the algorithm in FIGS. 11A and B, i.e. the three points that define the applicable plane. Equation 3 is the solution of Equation 2 for the maximum intensity.

$$Y_{\max} = \frac{\begin{array}{l}(x_{user} - x_1)(y_2 - y_1)(Y_3 - Y_1) + \\ (y_{user} - y_1)(Y_2 - Y_1)(x_3 - x_1) - \\ (x_{user} - x_1)(Y_2 - Y_1)(y_3 - y_1) - \\ (y_{user} - y_1)(Y_3 - Y_1)(x_2 - x_1)\end{array}}{(y_2 - y_1)(x_3 - x_1) - (x_2 - x_1)(y_3 - y_1)} + Y_1 \quad \text{Equation 3}$$

Equation 3 renders Ymax for the chromaticity ($x_{user}, y_{user}$) input 510. If the Y value of the input 510 is less than or equal to the maximum achievable intensity Ymax and is non-negative, then the input 510 is a valid point which can be achieved by the fixture. Accordingly, the MCU 502 will drive the digital/analog converter and LED drivers 504 for the LEDs 506 to output light according to the input 510.

On the other hand, if the Y value of the input 510 is greater than the maximum achievable intensity Ymax or negative, then the input 510 is invalid and cannot be achieved by the fixture.

There are several ways a light fixture may handle a requested input 510 which is not valid (i.e. outside the gamut 200, 300). One way would be to ignore the request so that a light fixture would not generate light according the input 510. The system, for example, might keep the light output at the last prior setting that was valid. Another approach would be to correct or adjust the input 510 coordinate by determining the nearest point which is logical. Because the human eye tends to be less sensitive to changes in intensity compared with changes in chromaticity, chromaticity has a higher importance than intensity. There are two general cases which should be considered when correcting points. The first is when the chromaticity of the input 510 ((x,y) coordinate) is valid but the requested intensity ((Y) value) is invalid. The second case is where the chromaticity point is invalid.

Since the human eye tends to perceive changes in chromaticity, (x,y) points which are in the gamut 200, 300 but have intensities greater than what is achievable, the chromaticity should be maintained. In other words, the (x,y) coordinates of the input 510 should not be altered. Using this philosophy, the closest Y-coordinate will be the maximum achievable point at the given (x,y). The maximum achievable intensity for the given (x,y) coordinate is determined according to Equation 3. Hence, an input 510 ($x_{user}, y_{user}, Y_{user}$) will be corrected to ($x_{user}, y_{user}, Y_{max}$). While this adjustment does not necessarily yield the closest point (absolute distance) to the input 510 coordinate, given that chromaticity is more important than intensity, it is generally more appealing to the human eye.

The second case of point correction requires additional computation. In the case where (x,y) coordinate is outside of the gamut 200, 300, in a first implementation the nearest chromaticity point physically is found which is in the gamut. However, the nearest chromaticity point may appear to be a different color. In a second implementation, a chromaticity point is chosen that has a color closest to the color corresponding to that which is represented by the coordinate that falls outside the gamut. However, this adjusted chromaticity point may correspond to a color that appears to be have more saturation. In either case, if the intensity of the adjusted (x,y) coordinate is achievable, then that intensity should be used. If the intensity is greater than what is achievable at the nearest chromaticity in the gamut 200, 300, the intensity should be changed to the maximum that is achievable as discussed above.

Figure 14:
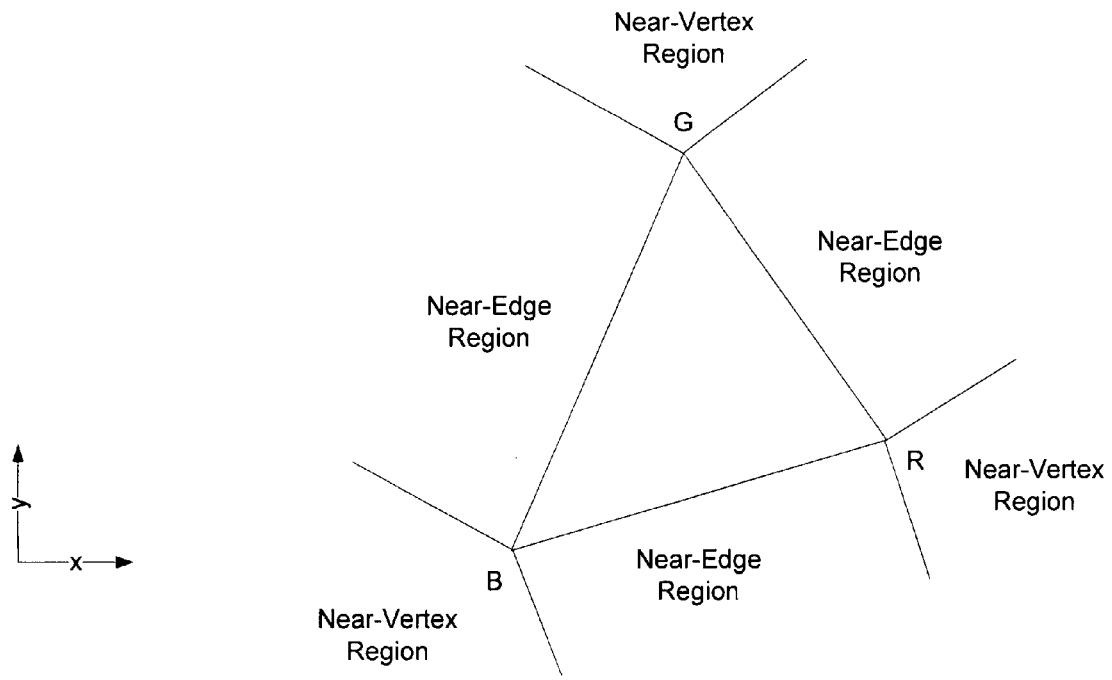
FIG. 14 illustrates a gamut in the x-y plane.

According to the first implementation, when finding the closest chromaticity to a (x,y) coordinate outside of the gamut 200, 300, there are two types of regions which could describe the space outside of the gamut 200, 300—a near-edge region and a near-vertex region. FIG. 14 illustrates the gamut 200, 300 in the x-y plane of the 3-d coordinate system. Since the gamut is a triangle, a near-vertex region corresponds to a region where the closest point will always be the vertex of the gamut 200, 300. The vertices correspond to the red, green, or blue colors. The other region corresponds to a near-edge region where the closest point corresponds to a point on the edge of the gamut 200, 300.

The near-edge regions and near-vertex regions are separated by lines which are perpendicular to the line segments which make the boundaries of the gamut 200, 300 and contain the vertex points. The area between the two perpendicular lines on the end of each gamut line segment forms the near-edge region. The remaining regions are the vertex-near regions.

Equations 4 and 5 yield the chromaticity coordinates on the edge of the gamut ($x_v, y_v$) which are closest to (x,y) coordinate which falls in the near-edge region. In Equations 4 and 5, ($x_u, y_u$) is the user's point, ($x_v, y_v$) is the adjusted point, ($x_1, y_1$) is one of the points at the end of the line segment which forms an edge of the gamut 200, 300, and ($x_2, y_2$) is the point at the other end of the line segment of the gamut 200, 300.

$$x_v = \frac{(x_2 y_1 - x_1 y_2)(y_1 - y_2) + (x_1 - x_2)^2 x_u + (y_1 - y_2) y_u}{(y_1 - y_2)^2 + (x_1 - x_2)^2} \quad \text{Equation 4}$$

$$y_v = \left(\frac{x_2 - x_1}{y_1 - y_2}\right)\left(\left[\frac{(x_2 y_1 - x_1 y_2)(y_1 - y_2) + (x_1 - x_2)^2 x_u + (y_1 - y_2) y_u}{(y_1 - y_2)^2 - (x_1 - x_2)^2}\right] - x_u\right) + y_u \quad \text{Equation 5}$$

If the user point is in the near-vertex region, then the closest chromaticity point is simply the closest vertex of the gamut. Any user point which is outside of the achievable volume will be corrected to a point with an intensity of the user's request unless it is too great for the maximum intensity of the corrected point. If it is too great, the maximum intensity for that chromaticity will be used.

Figure 15:
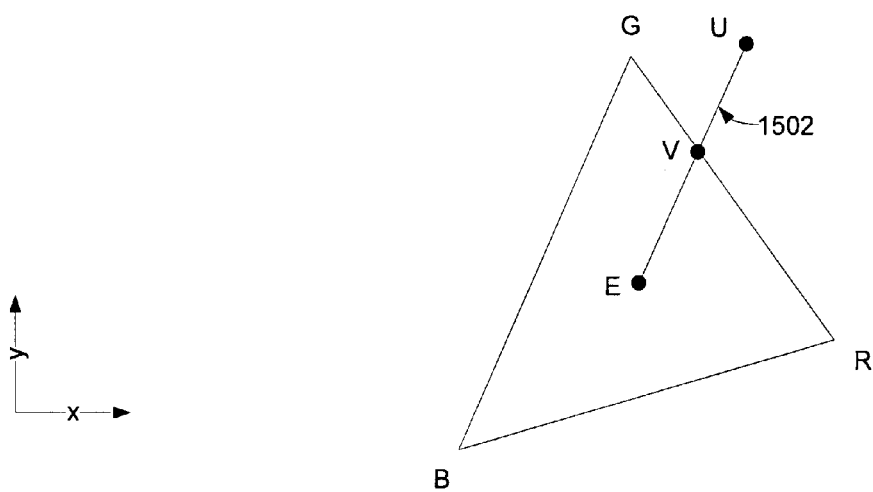
FIG. 15 illustrates a gamut in the x-y plane.
Figure 16:
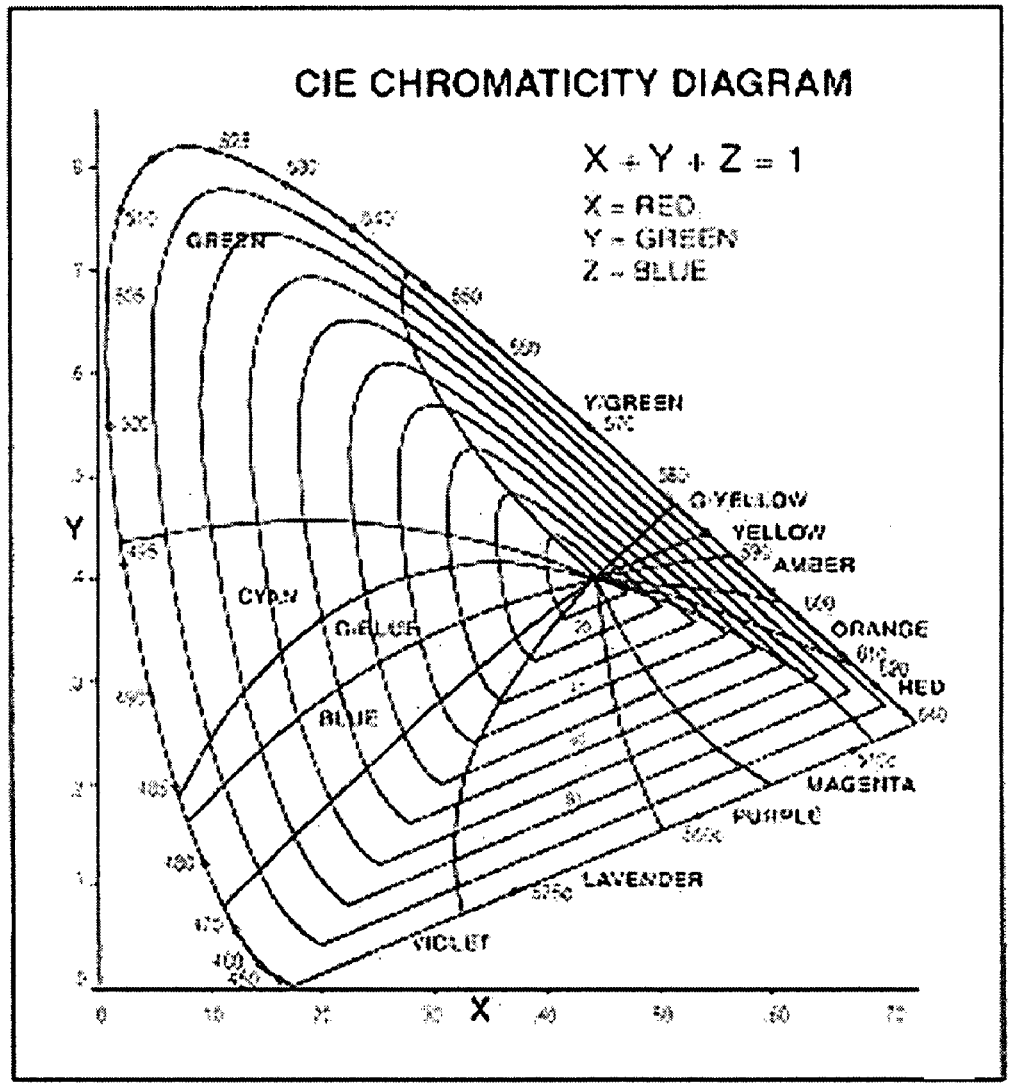
FIG. 16 illustrates a known CIE Chromaticity diagram.

FIG. 15 will be used to describe the second implementation of choosing the chromaticity point which is closest in color to the color corresponding to the point which falls outside the gamut. FIG. 15 illustrates the gamut 200, 300 in the x-y plane of the 3-d coordinate system. Point U represents the (x,y) coordinate of chromaticity chosen by the user. Point E represents a static point at coordinate (0.333, 0.333), which corresponds to a color having the same amounts of red, green and blue, i.e., the color of white. Therefore, colors at points along a line 1502 connecting points E and U will appear to be the same color but with more saturated towards the color white (in the direction of point E). Point V is selected as a point along the line connecting E and U that represents a color within the gamut having the same color as point U with some increased saturation towards the color white. In other words, the color at point V will be perceived by a human to be the same color at point U with more saturation towards the color white.

Point V may be determined according to the following equations. The general equation of a line is shown by Equation 6 below.

$$Ax + By = C \quad \text{Equation 6}$$

where:

$A = y_2 - y_1$
$B = x_1 - x_2$
$C = Ax_1 - Bx_2$ also, Let Line $\overline{RG}$: $A_{rg}x+B_{rg}y=C_{rg}$ Let Line $\overline{UE}$: $A_{ue}x+B_{ue}y=C_{ue}$ Depending on the position of point U, lines $\overline{GB}$ or $\overline{BR}$ may be used. It is well within the level for one of ordinary skill in the art to modify the above equations for lines $\overline{GB}$ or $\overline{BR}$. According to the equations above, the coordinates of point V may be calculated according to Equations 7 and 8 below. Again, it is well within the level of ordinary skill in the art to adapt Equations 7 and 8 for lines $\overline{GB}$ or $\overline{BR}$.

$$x_v = \frac{B_{ue}C_{rg} - B_{rg}C_{ue}}{A_{rg}B_{ue} - A_{ue}B_{rg}} \quad \text{Equation 7}$$

$$y_v = \frac{C_{ue} - A_{ue}x_v}{B_{ue}} \quad \text{Equation 8}$$

Accordingly, by adjusting the chromaticity value from the value corresponding to point U ($x_u$, $y_u$) to a value corresponding to point V ($x_v$, $y_v$), the light fixture will display a color that will be perceived by a human as the same color as that at point U with more saturation towards the color white.

The above-described techniques and operation are not limited to only Red, Green and Blue LEDs. It is again noted that the lighting system may include other LEDs 310 and associated D/A converter 322 and LED driver 330. In such a case, additional components of the lighting system would need to be calibrated possibly resulting in larger and complex analysis as represented above. In any event, additional calculations required should be well within the level of ordinary skill given this disclosure and concepts presented herein.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for setting operational limitations of a lighting system comprising at least first, second and third light sources generating light of respective first, second and third colors wherein the lighting system is configured to output light containing controlled amounts of light generated by at least one of the first, second and third light sources, the method comprising steps of:
   (a) determining a first maximum attainable intensity of light by measuring light output from the lighting system where the first light source is turned on and the second and third light sources are turned off;
   (b) determining a second maximum attainable intensity of light by measuring light output from the lighting system where the second light source is turned on and the first and third light sources are turned off;
   (c) determining a third maximum attainable intensity of light by measuring light output from the lighting system where the third light source is turned on and the first and second light sources are turned off;
   (d) determining a maximum intensity of light attainable by the lighting system represented by light generated by the first, second and third light sources; and
   (e) setting the lighting system to determine whether or not desired light corresponding to a given input setting to the lighting system is within a three-dimensional gamut representing colors of light and corresponding attainable intensities that the lighting system is capable of generating wherein a top contour of the gamut is defined by points corresponding to the first, second and third maximum attainable intensities and the maximum intensity of light attainable by the lighting system.

2. The method for setting operational limitations of the lighting system according to claim 1, further comprising steps of:
   (i) defining the gamut by a 3-dimensional coordinate system which is representative of colors of light of which the lighting system is capable of generating bounded by the first, second and third colors, the determined first, second, and third maximum attainable intensities, and the determined maximum intensity of light attainable by the system; and
   (ii) setting the lighting system to determine whether or not the desired light corresponding to the given input setting represents a color defined within the gamut.

3. The method for setting the lighting system according to claim 1, wherein in Steps (a)-(c) the first, second and third light sources are driven to maximize output, respectively.

4. The method for setting the lighting system according to claim 2, wherein the gamut is defined by coordinates (x,y,Y) where (x,y) corresponds to chromaticity and (Y) corresponds to intensity.

5. The method for setting the lighting system according to claim 2, wherein an apex of the gamut corresponds to a summation of at least the first, second and third maximum attainable intensities.

6. The method for setting the lighting system according to claim 2, wherein the apex represents a white color of light generated by the lighting system at a maximum attainable intensity when the first, second and third light sources are turned on.

7. The method for setting the lighting system according to claim 2, wherein the gamut has a polygon footprint representing chromaticity boundaries with vertices at coordinates corresponding to a color of light generated in each of Steps (a), (b) and (c).

8. The method for setting the lighting system according to claim 7, wherein the polygon footprint is triangular.

9. The method for setting the lighting system according to claim 2, wherein,
   (i) a plurality of intersecting planes form the gamut; and
   (ii) each of the plurality of planes intersect another of the planes having at least two coordinates selected from a group consisting of coordinates corresponding to the colors of light generated in Steps (a), (b) and (c), coordinates corresponding to the first, second and third maximum attainable intensities, and a coordinate corresponding to a summation of at least the first, second and third maximum attainable intensities.

10. The method for setting the lighting system according to claim 2, wherein the gamut is formed by at least six planes.

11. The method for setting the lighting system according to claim 1, further comprising the steps of:
    (i) determining a fourth maximum attainable intensity of light by measuring light output from the lighting system wherein the first and second light sources are turned on and the third light source is turned off;
    (ii) determining a fifth maximum attainable intensity of light by measuring light output from the lighting system wherein the first and third light sources are turned on and the second light source is turned off; and
    (iii) determining a sixth maximum attainable intensity of light by measuring light output from the lighting system wherein the second and third light sources are turned on and the first light source is turned off.

12. The method for setting the lighting system according to claim 11, further comprising the steps of:
(I) defining the gamut by a 3-dimensional coordinate system which is representative of colors of light of which the lighting system is capable of generating bounded by the first, second and third colors, the first through sixth maximum attainable intensities and the determined maximum intensity of light attainable by the system; and
(II) setting the lighting system to determine whether or not the desired light corresponding to the given input setting represents a color defined by the gamut.

13. The method for setting the lighting system according to claim 12, wherein,
(i) a plurality of intersecting planes form the gamut; and
(ii) each of the plurality of planes intersect another of the planes having at least two coordinates selected from a group consisting of coordinates corresponding to the colors of light generated in Steps (a), (b), (c), (i), (ii) and (iii), coordinates corresponding to the first, second, third, fourth, fifth and sixth maximum attainable intensities, and a coordinate corresponding to a summation of at least the first, second and third maximum attainable intensities.

14. The method for setting the lighting system according to claim 9, wherein the gamut is formed by at least nine planes.

15. The method for setting the lighting system according to claim 2, wherein the gamut is formed by a plurality of intersecting planes and at least three of the plurality of intersecting planes intersect at a point that represents the maximum intensity of light attainable by the system.

16. The method for setting the lighting system according to claim 2, wherein the gamut is formed by a plurality of intersecting planes and at least three of the plurality of intersecting planes form sides of a polygonal shaped gamut.

17. The method for setting the lighting system according to claim 16, wherein at least three of the plurality of intersecting planes intersect with the at least three of the plurality of intersecting planes that form sides of a polygonal shaped gamut, respectively, and converge at a point representing the maximum intensity of light attainable by the system.

18. The method for calibrating the lighting system according to claim 1, wherein the maximum intensity of light is determined by measuring light output by the optical system when the first, second and third light sources are turned on.

19. The method for calibrating the lighting system according to claim 1, wherein the maximum intensity of light is determined by a calculation based on at least the first, second and third maximum attainable intensities.

20. A method for processing input color parameters of chromaticity and intensity to a lighting system and controlling illumination outputs of a plurality of light sources of the lighting system to generate a desired color of light corresponding to the input color parameters, the method comprising steps of:
(a) determining whether the input color parameters of chromaticity and intensity places the desired color inside or outside of a gamut representing colors of light of which the lighting system is capable of generating, wherein the gamut is defined by a 3-dimensional coordinate system whereby each axis thereof corresponds to chromaticity or intensity values; and
(b) driving the plurality of light sources to emit light having the desired color when the input color parameters of chromaticity and intensity places the desired color within the gamut.

21. The method according to claim 20, wherein the gamut is formed by a plurality of intersecting planes.

22. The method according to claim 21, further comprising steps of:
(i) determining a coordinate of the chromaticity input color parameter in the 3-dimensional coordinate system;
(ii) comparing the coordinate of the chromaticity input color parameter to each of a plurality of lines formed by an intersection of two planes of the plurality of intersecting planes wherein the plurality of lines form a polygon; and
(iii) determining if the coordinate is outside the polygon based on the comparison result of step (ii).

23. The method according to claim 22, wherein three lines each formed by the intersection of two planes form the polygon.

24. The method according to claim 22, further comprising a step of determining whether or not the coordinate of the chromaticity input color parameter is outside of the polygon.

25. The method according to claim 22, wherein Step (ii) comprises steps of:
(I) for each of the plurality of lines, solving an equation representing a respective line according to at most all but one value of the coordinate wherein the coordinate comprises at least two values to define a position in the n-dimensional coordinate system; and
(II) comparing a result of step (I) with the one value of the coordinate.

26. The method according to claim 25, wherein Step (ii) further comprises steps of:
(A) for each of the plurality of lines, when a slope of the respective line is positive, determining if it is true that the one value of the coordinate is greater than or equal than the result of Step (I);
(B) for each of the plurality of lines, when a slope of the respective line is negative, determining if it is true that the one value of the coordinate is less than or equal than the result of Step (I); and
(C) for each of the plurality of lines, when a slope of the respective line is undefined, determining if it is true that the one value of the coordinate is equal to the result of Step (I),
wherein the coordinate is inside the polygon when for each of the plurality of lines the result of Steps (A), (B) or (C) is true and outside the polygon when at least one the respective results is false.

27. The method according to claim 26, further comprising step of determining that the lighting system is capable of generating chromaticity of the input color parameter when for each of the plurality of lines a result of Steps (A), (B) or (C) is true.

28. The method according to claim 21, further comprising steps of:
(i) determining a coordinate of the chromaticity input color parameter in the 3-dimensional coordinate system; and
(ii) comparing the coordinate of the chromaticity input color parameter to each of the plurality of planes for determining whether or not the lighting system is capable of generating light having a chromaticity corresponding to the desired color.

29. The method according to claim 28, wherein at least three planes of the plurality of planes intersect at an apex.

30. The method according to claim 29, further comprising the steps of:
(I) determining a coordinate of the intensity input color parameter associated with the coordinate of the chromaticity input color parameter; and (II) determining whether or not the coordinate of the intensity input color parameter is within a space formed by the at least three planes of the plurality of planes for determining whether or not the lighting system is capable of generating light having an intensity corresponding to the desired color.

31. The method according to claim 28, further comprising steps of:
(I) solving at least two equations each representing a line in a plane of the plurality of planes according to at most all but one value of the chromaticity coordinate wherein the chromaticity coordinate comprises at least two values to define a position in the 3-dimensional coordinate system; and
(II) comparing results of step (I) with the one value of the chromaticity coordinate.

32. The method according to claim 31, further comprising steps of:
(A) when a slope of the respective line is positive, determining if it is true that the one value of the chromaticity coordinate is greater than or equal than the result of Step (I); and
(B) when a slope of the respective line is negative, determining if it is true that the one value of the chromaticity coordinate is less than or equal than the result of Step (I).

33. The method according to claim 32, further comprising the step of identifying the plane of the plurality of planes for which Steps (A) or (B) is true for each of the at least two equations.

34. The method according to claim 33, further comprising the steps of:
(x) determining the intensity input color parameter associated with the coordinate of the chromaticity input color parameter; and
(y) determining whether or not the intensity input color parameter is less than or equal to a maximum achievable intensity to be generated by the lighting system for the of the chromaticity input color parameter.

35. The method according to claim 20, wherein the gamut is formed by a plurality of intersecting planes and at least three of the plurality of intersecting planes intersect at an apex which represents the maximum intensity of light attainable by the system.

36. The method according to claim 20, wherein the gamut is formed by a plurality of intersecting planes and at least three of the plurality of intersecting planes form sides of a polygonal shaped gamut.

37. The method according to claim 36, wherein at least three of the plurality of intersecting planes intersect with the at least three of the plurality of intersecting planes forming sides of the polygonal shaped gamut, respectively, and converge at a point representing the maximum intensity of light attainable by the system.

38. A method according to claim 20, further comprising the step of driving the plurality of light sources to emit light having a corrected desired color when the chromaticity or intensity color parameter places the desired color outside of the gamut.

39. The method according to claim 38, further comprising a step of determining whether the specific chromaticity value or the specific intensity value places the desired color outside the gamut.

40. The method according to claim 39, further comprising a step of when the specific intensity value places the desired color outside the gamut, changing the specific intensity value to a maximum intensity value for the specific chromaticity value that the lighting system is capable of generating.

41. The method according to claim 39, further comprising a step of, when the specific chromaticity value places the desired color outside the gamut, changing the specific chromaticity value to a new chromaticity value that the lighting system is capable of generating approximating the desired color.

42. The method according to claim 41, wherein the new chromaticity value has a coordinate in the 3-dimensional coordinate system that is not outside of the gamut.

43. The method according to claim 42, wherein the coordinate of new chromaticity value is substantially closest to a coordinate in the 3-dimensional coordinate system representing the desired color as compared to other coordinates in the 3-dimensional coordinate system that are not outside of the gamut.

44. The method according to claim 42, wherein the gamut has a polygon footprint with vertices each having at coordinate in the 3-dimensional coordinate system corresponding to a different color, further comprising a step of determining whether a coordinate of the specific chromaticity value in the 3-dimensional coordinate system is within a region near a vertex of the polygon footprint or a region near an edge of the polygon footprint.

45. The method according to claim 44, wherein when the coordinate of the specific chromaticity value is in the region near the vertex, the new chromaticity value has a coordinate in the 3-dimensional coordinate system corresponding to a coordinate corresponding to the vertex.

46. The method according to claim 44, wherein when the coordinate of the specific chromaticity value is in the region near the edge of the polygon footprint, the new chromaticity value corresponds to a point on the edge or substantially adjacent thereto on an inside of the polygon footprint.

47. A system for emitting light, comprising:
a plurality of light sources for emission of light and for thereby producing visible light to form a light at least of portion of which is output from the system;
a microcontroller for processing newly user inputted color parameters and controlling illumination emissions of the plurality of light sources, wherein:
the microcontroller is configured to evaluate a gamut defined by a 3-dimensional coordinate system of chromaticity and intensity values,
the gamut is representative of colors of light in which the system is capable of generating, and
the microcontroller executes the steps according to claim 20 for determining if the system is capable of generating light of the desired color.

48. The method for correcting a color parameter corresponding to a desired color having specific chromaticity and intensity values that is input to a lighting system comprising a plurality of light sources for generating light, wherein the lighting system is not capable of generating light corresponding to the desired color, the method comprising steps of:
(a) evaluating at least one of specific chromaticity and intensity values with respect to a gamut representing colors of light of which the lighting system is capable of generating, wherein,
the gamut is defined by a 3-dimensional coordinate system whereby each axis thereof corresponds to chromaticity or intensity values, and
the at least one of the specific chromaticity and intensity values is such as to place the desired color outside of the gamut; and
(b) changing the at least one of the specific chromaticity and intensity values to select a color within the gamut.

49. The method according to claim 48, further comprising a step of determining whether the specific chromaticity value or the specific intensity value places the desired color outside the gamut.

50. The method according to claim 49, wherein when the specific intensity value places the desired color outside the gamut, the changing step comprises the specific intensity value to a maximum intensity value for the specific chromaticity value that the lighting system is capable of generating.

51. The method according to claim 49, wherein when the specific chromaticity value places the desired color outside the gamut, the changing step comprises changing the specific chromaticity value to a new chromaticity value having substantially the same color as the desired color that the lighting system is capable of generating.

52. The method according to claim 51, wherein the new chromaticity value has a coordinate in the 3-dimensional coordinate system that is not outside of the gamut.

53. The method according to claim 51, wherein the coordinate of new chromaticity value has is substantially closest to a coordinate in the 3-dimensional coordinate system representing the desired color as compared to other coordinates in the 3-dimensional coordinate system that are not outside of the gamut.

54. The method according to claim 51, wherein the gamut has a polygon footprint with vertices each having at coordinate in the 3-dimensional coordinate system corresponding to a different color, further comprising a step of determining whether a coordinate of the specific chromaticity value in the 3-dimensional coordinate system is within a region near a vertex of the polygon footprint or a region near an edge of the polygon footprint.

55. The method according to claim 53, wherein when the coordinate of the specific chromaticity value is in the region near the vertex, the new chromaticity value has a coordinate in the 3-dimensional coordinate system corresponding to a coordinate corresponding to the vertex.

56. The method according to claim 51, wherein the coordinate of new chromaticity value has a coordinate value within the gamut and a chromaticity substantially the same as the chromaticity of the desired color as compared to other coordinates in the 3-dimensional coordinate system that are not outside of the gamut.

57. The method according to claim 56, wherein the chromaticity of the new chromaticity has a higher saturation of white when compared to the chromaticity of the desired color.

58. The method according to claim 56, wherein the coordinate of the new chromaticity value corresponds to a point on a line fm the coordinate and a coordinate inside the gamut.

59. The method according to claim 58, wherein the coordinate inside the gamut corresponds to the color of white.

60. The method according to claim 51, wherein the coordinate of new chromaticity value corresponds to a point on a line formed between adjacent vertices of a footprint of the gamut.

61. A system for emitting light, comprising:
a plurality of light sources for emission of light and for thereby producing visible light to form a light at least of portion of which is output from the system;
a microcontroller for processing newly user inputted color parameters and controlling illumination emissions of the plurality of light sources, wherein:
the microcontroller is configured to evaluate a gamut defined by a 3-dimensional coordinate system of chromaticity and intensity values,
the gamut is representative of colors of light in which the system is capable of generating, and
the microcontroller executes the steps according to claim 45 for adjusting the newly input color parameters.

* * * * *